(12) United States Patent
Sheng

(10) Patent No.: US 10,536,949 B2
(45) Date of Patent: Jan. 14, 2020

(54) POWER EFFICIENT RESOURCE UTILIZATION FOR V2X COMMUNICATIONS

(71) Applicants: Sharp Kabushiki Kaisha, Sakai, Osaka (JP); FG Innovation Company Limited, Tuen Mun, New Territories, Hong Kong (CN)

(72) Inventor: Jia Sheng, Vancouver, WA (US)

(73) Assignees: SHARP KABUSHIKI KAISHA, Sakai, Osaka (JP); FG INNOVATION COMPANY LIMITED, Tuen Nun, New Territories, Hong Kong (CN)

( * ) Notice: Subject to any disclaimer, the term of this patent is extended or adjusted under 35 U.S.C. 154(b) by 0 days.

(21) Appl. No.: 15/671,276

(22) Filed: Aug. 8, 2017

(65) Prior Publication Data

US 2018/0042023 A1    Feb. 8, 2018

Related U.S. Application Data

(60) Provisional application No. 62/372,095, filed on Aug. 8, 2016.

(51) Int. Cl.
*H04W 72/00* (2009.01)
*H04W 72/04* (2009.01)
*H04W 4/04* (2009.01)

(52) U.S. Cl.
CPC ....... *H04W 72/0486* (2013.01); *H04W 4/046* (2013.01)

(58) Field of Classification Search
CPC .......................... H04W 72/0486; H04W 4/046

USPC ........................................................ 455/450
See application file for complete search history.

(56) References Cited

U.S. PATENT DOCUMENTS

| | | | |
|---|---|---|---|
| 2012/0209519 A1 | 8/2012 | Basnayake | |
| 2015/0215903 A1 | 7/2015 | Zhao et al. | |
| 2015/0327180 A1 | 11/2015 | Ryu et al. | |
| 2016/0014812 A1* | 1/2016 | Park | H04L 5/0048 370/329 |
| 2016/0044618 A1 | 2/2016 | Sheng et al. | |
| 2016/0174122 A1 | 6/2016 | Sorrentino et al. | |
| 2016/0295624 A1* | 10/2016 | Novlan | H04W 72/02 |
| 2017/0006652 A1 | 1/2017 | Lee et al. | |

(Continued)

FOREIGN PATENT DOCUMENTS

| | | |
|---|---|---|
| WO | WO 2015/142074 A1 | 9/2015 |
| WO | WO 2015/178851 A1 | 11/2015 |
| WO | WO 2016/108551 A1 | 7/2016 |

OTHER PUBLICATIONS

International Search Report and Written Opinion dated Oct. 25, 2017 in PCT application PCT/US17/45846.

(Continued)

*Primary Examiner* — Amancio Gonzalez
(74) *Attorney, Agent, or Firm* — Nixon & Vanderhye P.C.

(57) ABSTRACT

A pedestrian related vehicle-to-Everything (V2X) user equipment (UE) which comprises: receiving circuitry configured to receive system information which contains a parameter set for pedestrian related V2X communications; and controlling circuitry configured to determine, based on the parameter set, whether the pedestrian related V2X UE performs random selection or the pedestrian related V2X UE performs sensing.

2 Claims, 17 Drawing Sheets

(56) References Cited

U.S. PATENT DOCUMENTS

| | | | | |
|---|---|---|---|---|
| 2017/0238321 A1* | 8/2017 | Sartori | ............... | H04W 72/0486 |
| | | | | 455/452.1 |
| 2017/0366920 A1* | 12/2017 | Agiwal | .................... | H04W 4/70 |
| 2018/0139593 A1* | 5/2018 | Chun | ....................... | H04W 4/12 |

OTHER PUBLICATIONS

3GPP TS 36.331 V13.0.0 Technical Specification, 3$^{rd}$ Generation Partnership Project; Technical Specification Group Radio Access Network; "Evolved Universal Terrestrial Radio Access (E-UTRA); Radio Resource Control (RRC); Protocol specification" (Release 13) (Dec. 2015).
RP-151109, Feasibility 2015 3GPP TSG RAN Meeting #68, Malmö, Sweden, Jun. 15-18, 2015.
RP-152293, Support for V2V services based on LTE sidelink, 3GPP TSG RAN Meeting #70, Sitges, Spain, Dec. 7-10, 2015.
3GPP TS 36.304 V13.0.0, Technical Specification, 3$^{rd}$ Generation Partnership Project; Technical Specification Group Radio Access Network; Evolved Universal Terrestrial Radio Access (E-UTRA); User Equipment (UE) procedures in idle mode (Release 13) (Dec. 2015).
3GPP TS 36.211 V13.5.0, Technical Specification, 3$^{rd}$ Generation Partnership Project; Technical Specification Group Radio Access Network; Evolved Universal Terrestrial Radio Access (E-UTRA); Physical channels and modulation (Release 13) (Mar. 2017).
3GPP TS 36.133 V13.7.0, Technical Specification, 3$^{rd}$ Generation Partnership Project; Technical Specification Group Radio Access Network; Evolved Universal Terrestrial Radio Access (E-UTRA); Requirements for support of radio resource management (Release 13) (Mar. 2017).
3GPP TSG RAN WG1 Meeting #84bis, Busan, Korea Apr. 11-15, 2016, Chairman notes.
3GPP TR 22.885 V14.0.0 3rd Generation Partnership Project; Technical Specification Group Services and System Aspects; Study on LTE Support for V2X Services (Release 14) (Dec. 2015).
U.S. Appl. No. 15/469,103, filed Mar. 24, 2017, entitled "Synchronization Method and Apparatus for V2X Communications".
U.S. Appl. No. 15/473,121, filed Mar. 29, 2017, entitled "Synchronization for Vehicle (V2X) Communications".
U.S. Appl. No. 15/477,299, filed Apr. 3, 2017, entitled "Resource Selection for Vehicle (V2X) Communications".
U.S. Appl. No. 15/592,869, filed May 11, 2017; entitled "entitled" Method and Apparatus for Selecting Between Overlapping and Non-Overlapping Resource Pools for Vehicle (V2X) Communications.
U.S. Appl. No. 15/592,896, filed May 11, 2017, entitled "Method and Apparatus for Selecting Radio Resources for Vehicle (V2X) Communications From an Overlapping Resource Pool".
R1-165207, Evaluation of PC5 transport for V2P/V21/I2V communications, NTT DOCOMO.
R1-164230, Evaluation results on PC5-based V2P, CATT.
Intelligent Transport Systems (ITS); Cross Layer DCC Management Entity for operation in the ITS G5A and ITS G5B medium, ETSI TS 103 175, V1.1.1 (Jun. 2015).
3GPP TSG RAN Meeting #68, RP-151109, LG Electronics, CATT, Bodafone, Huawei, "New SI Proposal: Feasibility Study on LTE-Based V2X Services" Malmö, Sweden, Jun. 15-18, 2015.
3GPP TSG RAN Meeting #70, RP-152293, LG Electronics, Huawei, HiSilicon, CATT, CATR, "New WI Proposal: Support for V2V Services Based on LTE Sidelink", Sitges, Spain, Dec. 7-10, 2015.
3GPP TSG-RAN WG1 #86b, R1-1610152, Qualcomm Incorporated, "Views on DL DMRS", Lisbon, Portugal, Oct. 10-14, 2016.
3GPP TSG RAN WG1 Meeting #84, R1-160734, Huawei, HiSilicon, "Timing Alignment of Different Synchronization Sources for V2V", St. Julian's, Malta, Feb. 15-19, 2016.
3GPP TSG RAN WG1 Meeting #84, R1-160758, Huawei, HiSilicon, "SLSS and PSBCH Design for V2V", St. Julian's, Malta, Feb. 15-19, 2016.
3GPP TSG RAN WG1 #83, R1-160577, Samsung, "Discussion on Synchronization for PC5 Based V2V", Anaheim, USA, Nov. 15-22, 2015.
3GPP TSG RAN WG1 Meeting #84, 156603, CATT, "Synchronization Enhancements in PC5-Based V2V", St. Julian's, Malta, Feb. 15-19, 2016.
3GPP TR 22.885 V1.0.0, Technical Report, 3$^{rd}$ Generation Partnership Project; Technical Specification Group Services and System Aspects; Study on LTE Support for V2X Services (Release 14) (Sep. 2015).
3GPP TSG RAN WG1 Meeting #84, R1-160360, CATT, "Synchronization Enhancements in PC5-Based V2V", St. Julian's, Malta, Feb. 15-18, 2016.
3GPP TSG RAN WG1 Meeting #86bis, R1-161072, CMCC, ZTE, ZTE Microelectronics, CATT, Xinwei, "WF on CSI Feedback Framework for Hybrid Beamforming in NR" Lisbon, Portugal, Oct. 10-14, 2016.
International Search Report and Written Opinion dated Jun. 12, 2017 in PCT Application No. PCT/US17/24763.
International Search Report and Written Opinion dated Jun. 27, 2017 in PCT Application No. PCT/US17/25692.
3GPP TSG RAN WG1 #84, R1-160575, Samsung, "Resource Pool for V2V", St. Julian's, Malta, Feb. 15-19, 2016.
3GPP TSG RAN WG1 Meeting #84, R1-160366, CATT, "Considerations on V2V traffic priority and relative resource allocation", St. Julian's, Malta, Feb. 15-19, 2016.
3GPP TSG RAN WG1 Meeting #84, R1-160636, LG Electronics, "Discussion on resource pool structure for PC5-based V2V", St. Julian's, Malta, Feb. 15-19, 2016.
3GPP TSG RAN WG1 Meeting #84, R1-160678, Sony, "Location based resource selection on LTE sidelink for V2V services", St. Julian's, Malta, Feb. 15-19, 2016.
3GPP TSG RAN WG1 Meeting #84, R1-160679, Sony, "Resource pool configurations on LTE sidelink for V2V services", St. Julian's Malta, Feb. 15-19, 2016.
3GPP TSG RAN WG1 Meeting #84, R1-160682, ZTE, "Resource pool allocation enhancement for V2V", St. Julian's, Malta, Feb. 15-19, 2016.
3GPP TSG RAN WG1 Meeting #84, R1-160689, ZTE, Discussion on resource allocation and procedure for V2V, St. Julian's, Malta, Feb. 15-19, 2016.
3GPP TSG RAN WG1 Meeting #84, R1-160895, Qualcomm Incorporated, "Resource Pool Design for V2V", St. Julian's, Malta, Feb. 15-19, 2016.
3GPP TSG RAN WG1 Meeting #84, R1-160909, Nokia Networks, Alcatel Lucent, Alcatel Lucent Shanghai Bell, "On resource control/ selection mechanisms for V2V operation", St. Julian's, Malta, Feb. 15-19, 2016.
3GPP TSG RAN WG1 Meeting #84, R1-R1-161031, General Motors, "Geo Based Resource Scheduling for V2V Communication", St. Julian's, Malta, Feb. 15-19, 2016.
3GPP TSG RAN WG1 Meeting #84, R1-160307, Huawei, HiSilicon, "UE autonomous resource selection", St. Julian's, Malta, Feb. 15-19, 2016.
3GPP TSG RAN WG1 Meeting #84, R1-160431, Intel Corporation, "Support of geo-based transmission schemes for V2V communication", St. Julian's Malta, Feb. 15-19, 2016.
3GPP TSG RAN WG1 Meeting #84, R1-161075, Ericsson, "Discussion on V2X PC5 Scheduling, Resource Pools and Resource Patterns" Malta, Feb. 15-19, 2016.
3GPP TSG RAN WG1 Meeting #85, "RAN1 Chairman's Notes", Nanjing, China, May 23-27, 2016.
3GPP TSG RAN WG1 Meeting #84, "RAN1 Chairman's Notes", St. Julian's, Malta, Feb. 15-19, 2016.
3GPP TSG RAN WG1 Meeting #83, "RAN1 Chairman's Notes", Anaheim, USA, Nov. 15-22, 2015.

* cited by examiner

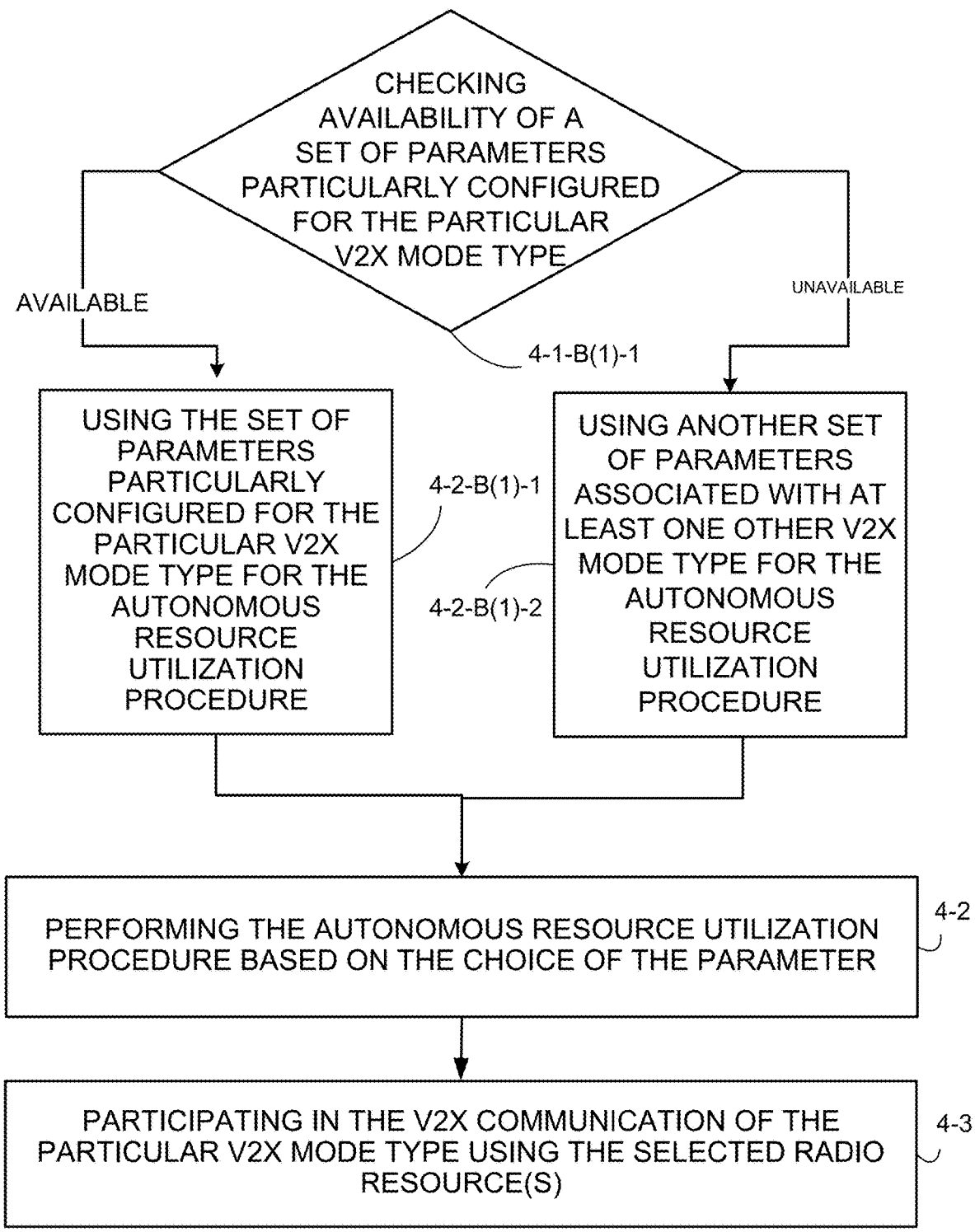
Fig. 4B(1)

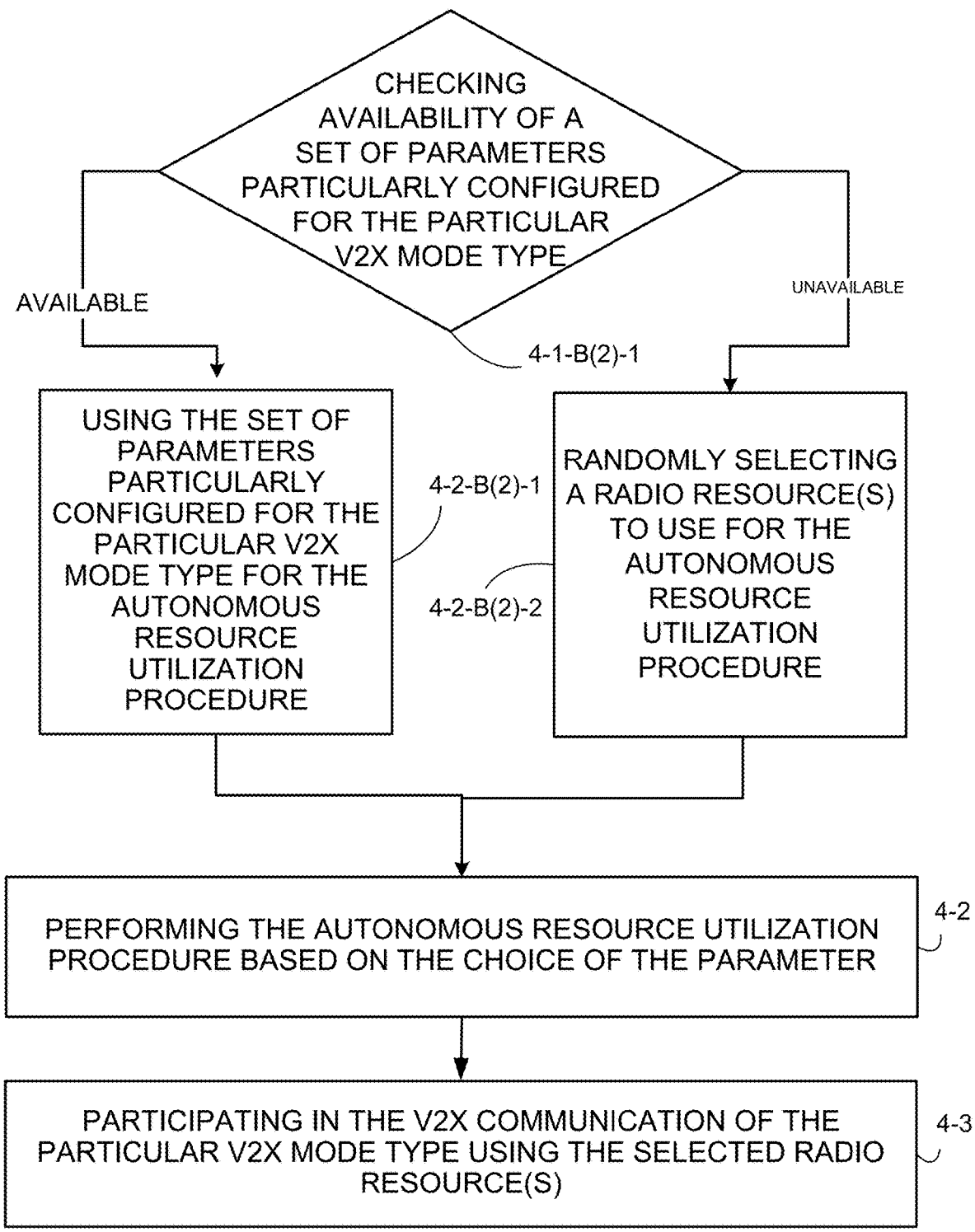
Fig. 4B(2)

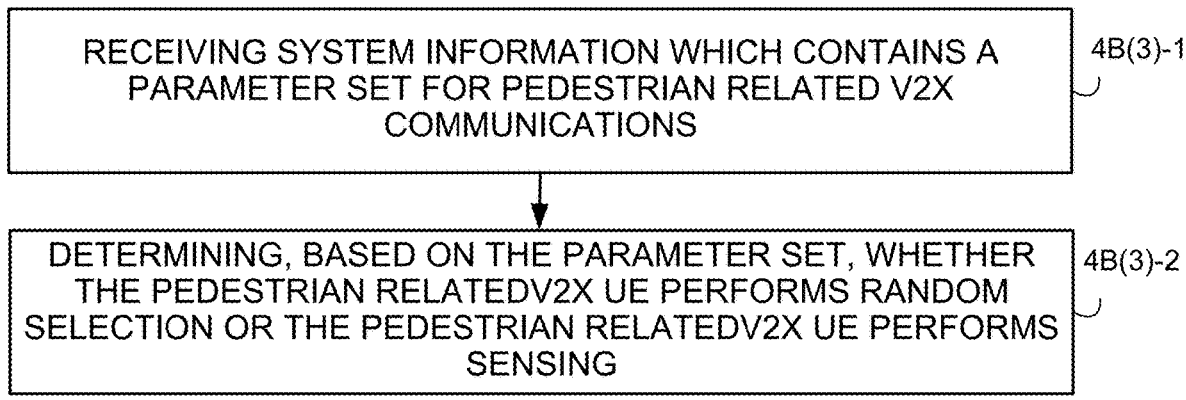
Fig. 4B(3)
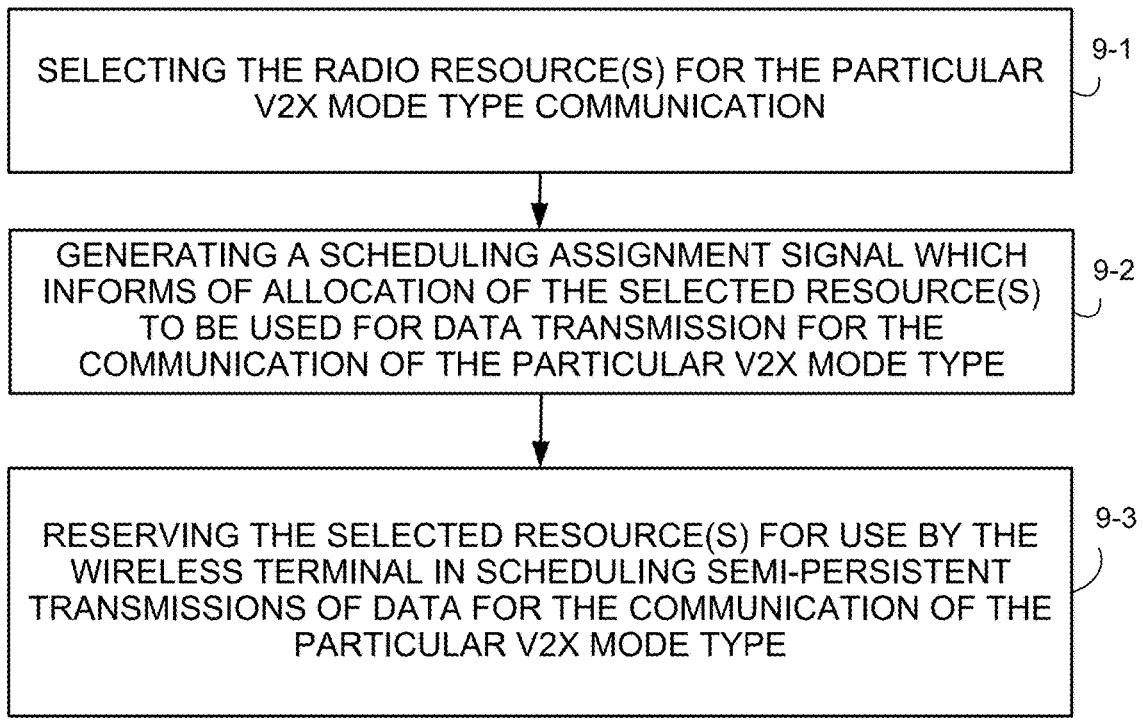
Fig. 9

POWER EFFICIENT RESOURCE UTILIZATION FOR V2X COMMUNICATIONS

This application claims the priority and benefit of U.S. Provisional patent application 62/372,095, filed Aug. 8, 2016, and entitled "POWER EFFICIENT RESOURCE UTILIZATION FOR V2X COMMUNICATIONS", which is incorporated by reference herein in its entirety.

TECHNICAL FIELD

The technology relates to wireless communications, and particularly to methods and apparatus for selecting and/or utilizing resources for vehicular communication services, e.g., V2X communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunication system. "Device-to-device ("D2D") communication may also be known as "sidelink direct" communication (e.g., sidelink communication), or even as "sidelink", "SL", or "SLD" communication.

D2D or sidelink direct communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices.

Currently 3GPP is specifying a new feature for Rel-14 that covers use cases and potential requirements for LTE support for vehicular communications services (represented by the term, Vehicle-to-Everything (V2X) Services). The feature is documented in the TR 22.885 on LTE Study on LTE Support for V2X Services. Contemplated V2X services may include one or more of the following:

V2V: covering LTE-based communication between vehicles. A device carried by a vehicle may herein be referred to as a vehicle UE or V-UE.

V2P: covering LTE-based communication between a vehicle and a device carried by an individual (e.g. handheld terminal carried by a pedestrian, cyclist, driver or passenger). A device carried by an individual or person may herein be referred to as a pedestrian UE or P-UE.

V2I/V2N: covering LTE-based communication between a vehicle and anything other than another vehicle unit or pedestrian unit. One example of a V2I/V2N includes an infrastructure entity such as a roadside unit (RSU). A roadside unit is a transportation infrastructure entity (e.g. an entity transmitting speed notifications). Another example of V2I/V2N is a network. Herein reference to "V2I" also refers to V2I/V2N. A device associated with an infrastructure entity or network may herein be referred to as an infrastructure UE or I-UE.

Vehicle (V2X) communication is described in one or more of the following (all of which are incorporated herein by reference in their entirety):

3GPP TS 36.331 V13.0.0 "Evolved Universal Terrestrial Radio Access (E-UTRA); Radio Resource Control (RRC); Protocol specification", including but not limited to § 5.10.3 (Sidelink communication monitoring), § 5.10.4 (Sidelink communication transmission), and § 9.3.2 (pre-configurable parameters).

RP-151109, Feasibility Study on LTE-based V2X Services 3GPP TSG RAN Meeting #68, Malmö, Sweden, Jun. 15-18, 2015.

RP-152293, Support for V2V services based on LTE sidelink, 3GPP TSG RAN Meeting #70, Sitges, Spain, Dec. 7-10, 2015

3GPP TSG RAN WG1 Meeting #84bis, Busan, Korea 11-15 Apr. 2016, Chairman notes.

3GPP TR 22.885 V0.4.0 3rd Generation Partnership Project; Technical Specification Group Services and System Aspects; Study on LTE Support for V2X Services (Release 14).

Initially 3GPP deliberations concerning vehicle-to-vehicle (V2V) communications essentially assumed reuse of LTE sidelink for V2V, e.g., assumed that the V2V communications will essentially be indistinct from sidelink direct communications in the access stratum (AS), e.g., may use the same PC5 radio access interface. As such, was initially generally been assumed that the LTE 3GPP resource selection design for SLD would be reused for V2X communication as much as possible. On the other hand, there are still numerous differences between V2X and D2D, such as higher V2X user equipment (UE) density and much higher V2X UE velocity.

Concepts for synchronization and resource pool design regarding V2X including V-UE and P-UE were disclosed in the following United States Provisional Patent applications (all incorporated herein by reference in their entirety):

U.S. Provisional Patent Application 62/313,600, filed Mar. 25, 2016, and U.S. patent application Ser. No. 15/469,103, filed Mar. 24, 2017, both entitled "SYNCHRONIZATION METHOD AND APPARATUS FOR V2X COMMUNICATIONS".

U.S. Provisional Patent Application 62/315,641, filed Mar. 30, 2016, and U.S. patent application Ser. No. 15/473,121, filed Mar. 29, 2017, both entitled "SYNCHRONIZATION FOR VEHICLE (V2X) COMMUNICATIONS".

U.S. Provisional Patent Application 62/319,065, filed Apr. 6, 2016, and U.S. patent application Ser. No. 15/477,299, filed Apr. 3, 2017, both entitled "RESOURCE SELECTION FOR VEHICLE (V2X) COMMUNICATIONS".

U.S. Provisional Patent Application 62/335,609, filed May 12, 2016, U.S. Provisional Patent Application 62/335,609, filed May 14, 2016, and U.S. patent application Ser. No. 15/592,869, filed May 11, 2017; all entitled "entitled "METHOD AND APPARATUS FOR SELECTING BETWEEN OVERLAPPING AND NON-OVERLAPPING RESOURCE POOLS FOR VEHICLE (V2X) COMMUNICATIONS", U.S. Provisional Patent Application 62/335,581 filed May 12, 2016, and U.S. patent application Ser. No. 15/592,896, filed May 11, 2017, both entitled "METHOD AND APPARATUS FOR SELECTING RADIO RESOURCES FOR VEHICLE (V2X) COMMUNICATIONS FROM AN OVERLAPPING RESOURCE POOL".

In some aspects of one of more of the foregoing, different service types (V or P) are distinguishable in resource selection.

Various recent 3GPP RAN agreements in the form of study items and works items have concerned vehicle-to-vehicle (V2V) communications. Among these are the following (all of which are incorporated herein by reference in their entirety):

RP-151109, Feasibility Study on LTE-based V2X Services", from the 3GPP RAN #68 meeting.

RP-152293, Support for V2V services based on LTE sidelink, from the 3GPP RAN #70 meeting, which gives the highest priority of V2X communications to vehicle UE (V-UE) to vehicle UE communications.

RP-161298, LTE based V2X Services at the most recent 3GPP RAN # 72 meeting.

The RP-161298 of the 3GPP RAN # 72 dealt with pedestrian UE (P-UE) participating in V2X communications. It was concluded that V2P services where a pedestrian-borne wireless terminal (P-UE) sends V2X messages but does not receive V2X messages is substantially more power efficient than V2P services where the P-UE receives V2X messages from vehicle-borne wireless terminals (V-UEs), which means P2V transmission instead of P2V monitoring at P-UE side should be emphasized. In order to specify enhancements for support of V2P services, "random resource selection for P-UEs potentially on the PC5 resource pool shared with V-UE transmissions, with additional study on sensing operation during a limited time for P-UEs" was proposed.

Sensing before transmission is mandated for V2V transmission in order to reduce random resource selection collision to improve PRR (packet reception ratio) performance. Power consumption of sensing becomes an issue to P-UE in P2V transmission. R1-165208, "Further detail of partial sensing for P2V operation", NTT DOCOMO, incorporated herein by reference, introduces a partial sensing method for P2V operation, which proposes a UE-specific sensing window with sensing operation in limited time. In the R1-165208 approach, the UE not only receives signaling about common sensing window, but also receives signaling about another specific sensing window. If the UE has to use specific sensing window, then how the UE determines which sensing window to be used is not clear in R1-165208. The R1-165208 thus defines a new specific sensing window, and therefore requires additional signaling, since the common sensing window has already been defined.

There are problems for pedestrian-borne wireless terminals (P-UEs) making random resource selection from a resource pool shared with vehicle-borne wireless terminals (V-UEs), considering the particular service requirements of P-UEs, and considering the fact that the sensing strategy of a V-UE which may share the resource pool. Furthermore, although the P-UE and V-UE may have different Quality of Service (QoS) requirement, there is no priority based strategy for resource selection.

What is needed, therefore, and an example object of the technology disclosed herein, are methods, apparatus, and techniques for radio resources selection and utilization in V2X communications.

SUMMARY

In one of its example aspects the technology disclosed herein pertains to a pedestrian related vehicle-to-Everything (V2X) user equipment (UE) (e.g., wireless terminal) which comprises receiving circuitry and processor circuitry (controlling circuitry). The receiving circuitry is configured to receive system information which comprises a parameter set for pedestrian related V2X communications. The controlling circuitry is configured to determine, based on the parameter set, whether the pedestrian related V2X UE performs random selection or the pedestrian related V2X UE performs sensing.

In another of its example aspects the technology disclosed herein pertains to a method in a pedestrian related vehicle-to-Everything (V2X) user equipment (UE) (e.g., wireless terminal). In a basic embodiment and mode the method comprises receiving system information which contains a parameter set for pedestrian related V2X communications; and determining, based on the parameter set, whether the pedestrian related V2X UE performs random selection or the pedestrian related V2X UE performs sensing.

In another of its example aspects the technology disclosed herein pertains to a wireless terminal which comprises processor circuitry and a transceiver. The processor circuitry is configured to select, based on a particular V2X mode type, of a parameter to use in an autonomous resource utilization procedure wherein the wireless terminal selects radio resource(s) for use in a V2X communication of the particular V2X mode type, and to perform the autonomous resource utilization procedure based on the selection of the parameter. The transceiver circuitry is configured to participate in the V2X communication of the particular V2X mode type over a radio interface using the selected radio resource(s)

In an example embodiment and mode the particular V2X mode type is a vehicle-to-pedestrian/pedestrian-to-vehicle (V2P/P2V) mode.

In an example embodiment and mode the processor circuitry is configured to make the selection of a first set of parameters and a second set of parameters for use in the autonomous resource utilization procedure, the second set of parameters being configured for use in the autonomous resource utilization procedure for operation in the particular V2X mode type.

In an example embodiment and mode the second set of parameters is configured for use in the autonomous resource utilization procedure for power-saving operation in the particular V2X mode type and the first set of parameters is configured for use in the autonomous resource utilization procedure for operation in either a V2X mode type other than the particular V2X mode type or for plural V2X mode types.

In an example embodiment and mode the particular V2X mode type is a vehicle-to-pedestrian/pedestrian-to-vehicle (V2P/P2V) mode.

In an example embodiment and mode the first set of parameters and the second set of parameters are obtained from system information broadcasted from a base station node of a radio access network (RAN).

In an example embodiment and mode the first set of parameters and the second set of parameters are obtained from respective information elements of a same system information block broadcasted from the base station node of the radio access network (RAN).

In an example embodiment and mode the first set of parameters and the second set of parameters are configured at the wireless terminal.

In an example embodiment and mode the processor circuitry is configured check availability of a set of parameters particularly configured for the particular V2X mode type, and in accordance with the check: (1) if the set of parameters particularly configured for the particular V2X mode type is available, to use the set of parameters particularly configured for the particular V2X mode type for the autonomous resource if utilization procedure; (2) if the set of parameters particularly configured for the particular V2X mode type is not available, to use another set of parameters associated with at least one other V2X mode type.

In an example embodiment and mode the processor circuitry is configured check availability of a set of parameters particularly configured for the particular V2X mode type, and in accordance with the check: (1) if the set of parameters particularly configured for the particular V2X mode type is available, to use the set of parameters particularly configured for the particular V2X mode type for the autonomous resource if utilization procedure; (2) if the set of parameters particularly configured for the particular V2X mode type is not available, to randomly select a radio resource(s).

In an example embodiment and mode the autonomous resource utilization procedure comprises a resource selection operation, and the parameter is related to an endpoint of a resource sensing window of the resource selection operation.

In an example embodiment and mode the autonomous resource utilization procedure comprises a resource selection operation, and the parameter is related to selection criteria for resource selection.

In an example embodiment and mode the parameter specifies one of the following:
(1) both scheduling assignment decoding and resource energy measurement are to be used as the selection criteria in the resource selection operation;
(2) only scheduling assignment decoding is to be used as the selection criteria in the resource selection operation;
(3) scheduling assignment decoding for only selected other wireless terminals is to be used as the selection criteria in the resource selection operation;
(4) only resource energy measurement are to be used as the selection criteria in the resource selection operation.

In an example embodiment and mode the autonomous resource utilization procedure comprises transmission using a selected radio resource in the particular V2X mode.

In an example embodiment and mode a size of a transmission window in which semi-persistent scheduling of the particular V2X mode transmission occurs is dependent on the parameter.

In an example embodiment and mode frequency at which semi-persistent scheduling of the particular V2X mode transmission occurs is dependent on the parameter.

In an example embodiment and mode the processor circuitry is configured to select, based on a particular V2X mode type, of plural parameters to use in the autonomous resource utilization procedure; to perform the autonomous resource utilization procedure based on the selection of the plural parameters.

In another of its example aspects the technology disclosed herein concerns a method of operating a wireless terminal. In a basic mode the method comprises: selecting, based on a particular V2X mode type, of a parameter to use in an autonomous resource utilization procedure wherein the wireless terminal selects radio resource(s) for use in a V2X communication of the particular V2X mode type; performing the autonomous resource utilization procedure based on the selection of the parameter; and participating in the V2X communication of the particular V2X mode type over a radio interface using the selected radio resource(s).

In another of its example aspects the technology disclosed herein concerns a wireless terminal comprising electronic memory circuitry; processor circuitry, and transceiver circuitry. The electronic memory circuitry is configured to store a description of a common resource pool(s) of radio resources ordinarily available for use in communications of plural V2X modes types. The processor circuitry is electronically coupled to the electronic memory circuitry and configured, in conjunction with selection of a selected resource(s) from the common resource pool(s) for a communication of a particular V2X mode type: (1) to generate a scheduling assignment signal which informs of allocation of the selected resource(s) for the communication of a particular V2X mode type; and (2) to reserve the selected resource(s) for use by the wireless terminal in scheduling semi-persistent transmissions of data for the communication of the particular V2X mode type, the semi-persistent transmissions comprising periodical use of the selected resource(s) over a transmission time window, all of the semi-persistent transmissions of the data for the communication of the particular V2X mode type being based on the same scheduling assignment signal. The transceiver circuitry is configured to participate in the V2X communication of the particular V2X mode type over a radio interface using the selected radio resource(s).

In an example embodiment and mode the particular V2X mode type is a vehicle-to-pedestrian/pedestrian-to-vehicle (V2P/P2V) mode.

In an example embodiment and mode the processor circuitry is further configured to reserve the selected resource(s) for use by the wireless terminal in the scheduling of the semi-persistent transmissions of the data for the communication of the particular V2X mode type to the exclusion of any other communications; but to release the selected resource(s) back to the common pool for use by other communications after a finite time duration or upon occurrence of a trigger event.

In an example embodiment and mode the processor circuitry is further configured to determine a size of a transmission time window, in which the semi-persistent transmissions of the data for the communication of the particular V2X mode type occurs, in dependence on the particular V2X mode type.

In an example embodiment and mode the processor circuitry is further configured to determine a frequency at which the semi-persistent transmissions of the data for the communication of the particular V2X mode type occurs in dependence on the particular V2X mode type.

In another of its example aspects the technology disclosed herein concerns a wireless terminal comprising electronic memory circuitry; processor circuitry, and transceiver circuitry. The electronic memory circuitry is configured to store a description of a common resource pool(s) of radio resources ordinarily available for use in communications of plural V2X modes types. The processor circuitry is electronically coupled to the electronic memory circuitry and configured, in conjunction with selection of a selected resource(s) from the common resource pool(s) for a communication of a particular V2X mode type: (1) to allocate the selected resource(s) for use by the wireless terminal in scheduling semi-persistent transmissions of data for the communication of the particular V2X mode type, the semi-persistent transmissions comprising periodical use of the selected resource(s) over a transmission time window; (2) to determine a size of a transmission time window, in which the semi-persistent transmissions of the data for the communication of the particular V2X mode type occurs, in dependence on the particular V2X mode type. The transceiver circuitry is configured to participate in the V2X communication of the particular V2X mode type over a radio interface using the selected radio resource(s).

In an example embodiment and mode the processor circuitry is further configured to include an indication of the size of a transmission time window in a scheduling assignment (SA) signal.

In another of its example aspects the technology disclosed herein concerns a wireless terminal comprising electronic memory circuitry; processor circuitry, and transceiver circuitry. The electronic memory circuitry is configured to store a description of a common resource pool(s) of radio resources ordinarily available for use in communications of plural V2X modes types. The processor circuitry is electronically coupled to the electronic memory circuitry and configured, in conjunction with selection of a selected resource(s) from the common resource pool(s) for a communication of a particular V2X mode type: (1) to allocate the selected resource(s) for use by the wireless terminal in scheduling semi-persistent transmissions of data for the communication of the particular V2X mode type, the semi-persistent transmissions comprising periodical use of the selected resource(s) over a transmission time window; and (2) to determine a frequency at which the semi-persistent transmissions of the data for the communication of the particular V2X mode type occurs in dependence on the particular V2X mode type. The transceiver circuitry is configured to participate in the V2X communication of the particular V2X mode type over a radio interface using the selected radio resource(s)

In an example embodiment and mode the processor circuitry is further configured to include an indication of the frequency at which the semi-persistent transmissions of the data for the communication of the particular V2X mode type occurs in a scheduling assignment (SA) signal.

In another of its example aspects the technology disclosed herein concerns a method of operating a wireless terminal. The method comprises, in conjunction with selection of a selected resource(s) from a common resource pool(s) for a communication of a particular V2X mode type: generating a scheduling assignment signal which informs of allocation of the selected resource(s) for the communication of a particular V2X mode type; reserving the selected resource(s) for use by the wireless terminal in scheduling semi-persistent transmissions of data for the communication of the particular V2X mode type, the semi-persistent transmissions comprising periodical use of the selected resource(s) over a transmission time window, all of the semi-persistent transmissions of the data for the communication of the particular V2X mode type being based on the same scheduling assignment signal; and, participating in the V2X communication of the particular V2X mode type over a radio interface using the selected radio resource(s).

In another of its aspects the technology disclosed herein concerns a wireless terminal comprising processor circuitry and transceiver circuitry. The processor circuitry is configured to perform a resource sensing operation of an autonomous resource utilization procedure over a sensing time window. The sensing time window having a sensing time window size configured: (1) to be particularly suitable for a vehicle-to-pedestrian/pedestrian-to-vehicle (V2P/P2V) mode; and (2) to be specific to a cell providing coverage for the wireless terminal. The processor circuitry is also configured to perform the autonomous resource utilization procedure and thereby obtain a selected radio resource(s) for a V2P/P2V mode communication. The transceiver circuitry is configured to participate in the V2P/P2V mode communication over a radio interface using the selected radio resource(s).

In an example embodiment and mode the transceiver is further configured to obtain a parameter affecting the sensing time window size from a broadcast of a base station node.

In an example embodiment and mode the parameter affecting the sensing time window size is an endpoint of the sensing time window.

In another of its example aspects the technology disclosed herein concerns a method of operating a wireless terminal. The method comprises performing a resource sensing operation of an autonomous resource utilization procedure over a sensing time window. The sensing time window having a sensing time window size configured: (1) to be particularly suitable for a vehicle-to-pedestrian/pedestrian-to-vehicle (V2P/P2V) mode; and (2) to be specific to a cell providing coverage for the wireless terminal. The method further comprises performing the autonomous resource utilization procedure and thereby obtaining a selected radio resource(s) for a V2P/P2V mode communication; and participating in the V2P/P2V mode communication over a radio interface using the selected radio resource(s).

In another of its example aspects the technology disclosed herein concerns a wireless terminal comprising processor circuitry and transceiver circuitry. The processor circuitry is configured to perform a resource selection operation of an autonomous resource utilization procedure using resource selection criteria selected for wireless terminal in dependence on a particular V2X mode type of communication to be performed by the wireless terminal, and thereby obtain a selected resource(s) for a communication of the particular V2X mode type. The transceiver circuitry is configured to participate in the communication of the particular V2X mode type over a radio interface using the selected radio resource(s).

In an example embodiment and mode the resource selection criteria is at least one of the following:
  (1) certain default criteria for the particular V2X mode type;
  (2) based on the particular V2X mode type battery information;
  (3) based on base station information or higher layer information;
  (4) based on the wireless terminal's own congestion level measurement.

In another of its aspects the technology disclosed herein concerns a method of operating a wireless terminal. In a basic mode the method comprises: performing a resource selection operation of an autonomous resource utilization procedure using resource selection criteria selected for wireless terminal in dependence on a particular V2X mode type of communication to be performed by the wireless terminal, and thereby obtain a selected resource(s) for a communication of the particular V2X mode type; participating in the communication of the particular V2X mode type over a radio interface using the selected radio resource(s)

In another of its example aspects the technology disclosed herein concerns an access node of a radio access network (RAN). The access node comprises node processor circuitry and a node transmitter. The node processor circuitry is configured to generate a signal to inform a wireless terminal of a parameter to be used by the wireless terminal in an autonomous resource utilization procedure. The parameter is a parameter uniquely associated with a particular V2X mode type as opposed to (1) V2X mode types other than the particular V2X mode type or (2) plural V2X node types. The transmitter circuitry is configured to transmit the parameter to the wireless terminal over a radio interface.

In an example embodiment and mode the parameter is related to size of a sensing window utilized by the wireless terminal in a resource sensing procedure.

In an example embodiment and mode the parameter is related to size of a resource allocation window to be used by the wireless terminal in the autonomous resource utilization procedure.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 4B(1), FIG. 4B(2), and FIG. 4B(3) are flowcharts showing example, representative, basic acts or steps performed by wireless terminals which check availability of a set of parameters particularly configured for a particular V2X mode type and which take alternative actions in the event of unavailability.

FIG. 9 is a flowchart showing example, representative, basic acts or steps performed by wireless terminal of FIG. 8.

DETAILED DESCRIPTION

Figure 1:
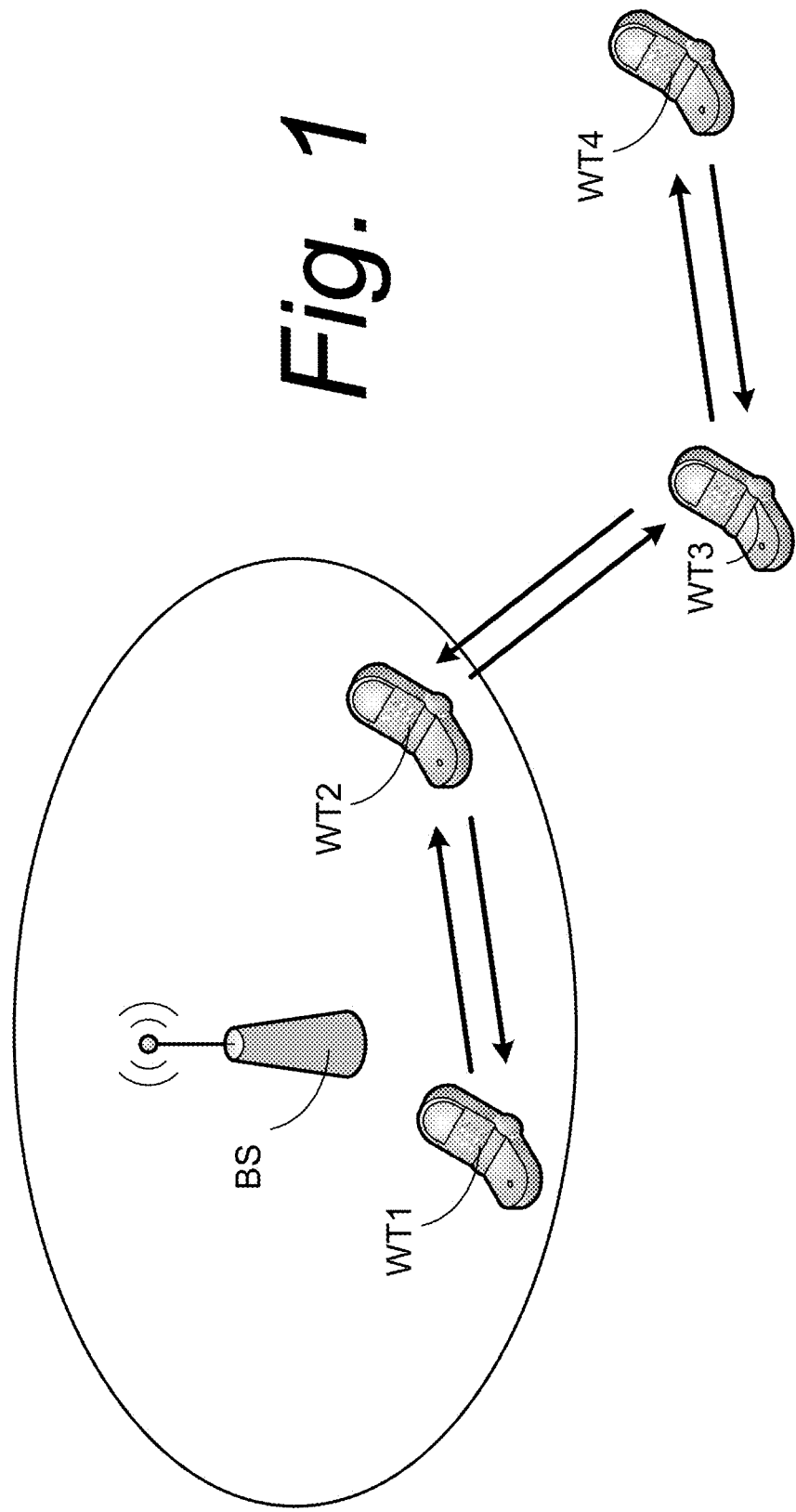
FIG. 1 is a diagrammatic view showing generally three scenarios which may occur in vehicle (V2X) communication, i.e., an in coverage vehicle (V2X) communication scenario; a partial coverage vehicle (V2X) communication scenario; and an out-of-coverage vehicle (V2X) communication scenario.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" may refer to a mode of communication between or among wireless terminals that operate on a cellular network or other telecommunications system in which the communication data traffic from one wireless terminal to another wireless terminal may or may not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). Sidelink communication thus encompasses one or both of SL signaling (e.g., SL control information) and SL data. The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", "sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. D2D or SL communication signals may be transmitted directly from a first wireless terminal to a second wireless terminal. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a "gNB" (as known, for example, in 5G "New Radio"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, 13, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Vehicle (V2X) communication is a communication that involves a radio connection established between a transmit device and a receive device (e.g., a wireless terminal or UE), which radio communication may or may not transit via a base station node of the network, with at least of one the transmit device and the receive device being mobile, e.g., capable of being moved. Generic V2X encompasses one or more of vehicle to infrastructure (V2I/V2N) communication; vehicle to person/pedestrian (V2P) communication; and vehicle to vehicle (V2V) communication.

Generally, there are three general scenarios which may occur in vehicle (V2X) communication. Those three general vehicle (V2X) communications scenarios are illustrated in FIG. 1. A first vehicle (V2X) communication scenario is an "in coverage" vehicle (V2X) communication scenario, illustrated between WT1 and WT2 of FIG. 1, in which both WT1 and WT2 are within coverage of the cellular radio access network. A second vehicle (V2X) communication scenario is a "partial coverage" scenario, illustrated between WT2 and WT3 of FIG. 1. In the "partial coverage" vehicle (V2X) communication scenario the wireless terminal WT2 is within coverage of the cellular radio access network, but the wireless terminal WT3 is out-of-coverage of the cellular radio access network. A third vehicle (V2X) communication scenario is an "out-of-coverage" scenario, illustrated between wireless terminal WT3 and wireless terminal WT4 of FIG. 1. In the out-of-coverage vehicle (V2X) communication scenario both the wireless terminal WT3 and the wireless terminal WT4 are out-of-coverage of the cellular radio access network.

The three vehicle (V2X) communication scenarios are described with reference to whether or not a participating wireless terminals (e.g., WTs) are "in coverage" or "out-of-coverage" of one or more cellular radio access networks (which may collectively be referred to as a "cellular radio access network"). For sake of simplicity FIG. 1 depicts "coverage" as being with respect to an access node BS such as eNodeB which comprises a cellular radio access network. It should be understood, however, that a wireless terminal may also be in coverage of the cellular radio access network when served by any cell of the cellular radio access network(s). For example, if wireless terminal WT1 and wireless terminal WT2 were served by different cells, when participating in vehicle (V2X) communication the wireless terminal WT1 and wireless terminal WT2 would still be in an in coverage vehicle (V2X) communication scenario.

Figure 2:
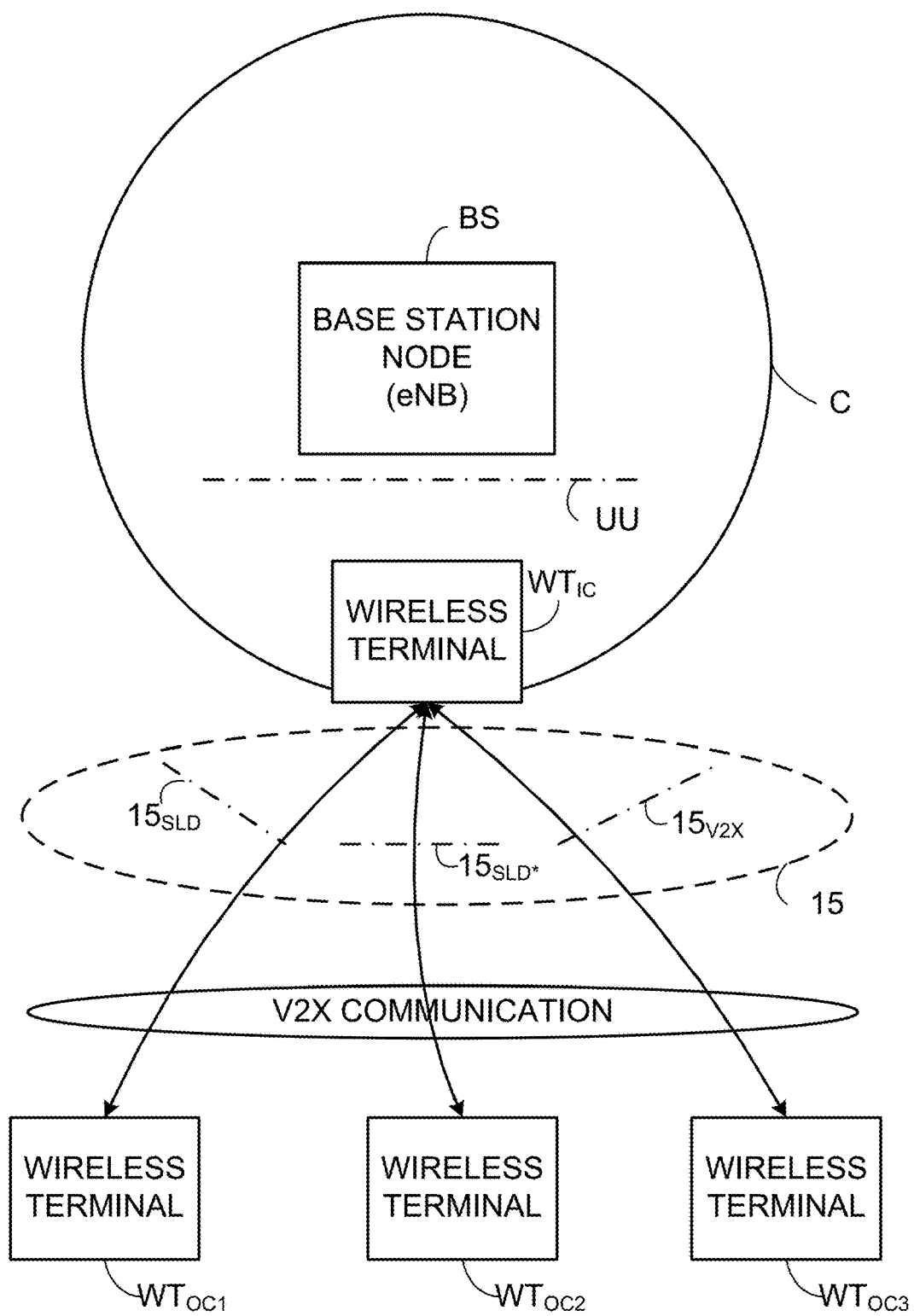
FIG. 2 is a diagrammatic view showing that, in differing implementations, V2X communication may be implemented either in conjunction with sidelink direct (SLD) communication, in conjunction with enhanced SLD, or apart from SLD as a separate V2X communication protocol.

As used herein and as illustrated in FIG. 2, V2X communication may be implemented in several ways. For illustrative context, FIG. 2 illustrates a base station node BS of a cellular radio access network which serves a cell C. The base station BS may communicate with a wireless terminal $WT_{IC}$ which is in coverage of the cellular radio access network over a radio interface UU. FIG. 2 further shows that wireless terminal $WT_{IC}$ may engage in vehicle (V2X) communication with one or more other wireless terminals which are outside of coverage of the cellular radio access network, particularly wireless terminal $WT_{OC1}$, wireless terminal $WT_{OC2}$, and wireless terminal $WT_{OC3}$. It is assumed that either wireless terminal $WT_{IC}$, or all of wireless terminal $WT_{OC1}$, wireless terminal $WT_{OC2}$, and wireless terminal $WT_{OC3}$ are mobile terminals for the communication to be vehicle (V2X) communication. Being "mobile" means that the wireless terminal is provided or situated in/with a mobile entity, such as a vehicle or a person.

As a first example implementation, V2X communication may be implemented using applications and resources of the type that were utilized for sidelink direct (SLD) communication (also known as device-to-device ("D2D") communication) before introduction of vehicle (V2X) communication. For example, when implemented as part of SLD communication the V2X communication may use resources and channels of the SLD communication scheme. In such first implementation the V2X communication may be said to be implemented using pre-V2X sidelink direct (SLD) protocol and over a pre-V2X sidelink direct (SLD) radio interface 15SLD.

As a second example implementation, V2X communication may be implemented using enhanced applications and enhanced resources utilized for sidelink direct (SLD) communication, e.g., sidelink direct communications augmented or enhanced with additional capabilities to accommodate vehicle (V2X) communication. In such second implementation the V2X communication may be said to be implemented using enhanced sidelink direct (SLD) protocol and over an enhanced sidelink direct (SLD) radio interface 15SLD*.

As a third example implementation, V2X communication may operate separately from sidelink direct (SLD) communication by, e.g., having separate and dedicated V2X communication resources and channels, and by being performed using application software which is specific to V2X communication. In such third implementation the V2X communication may be said to be implemented using separate vehicle (V2X) communications protocol and over a separate vehicle (V2X) communication radio interface 15V2X.

The fact that three example implementations are illustrated in FIG. 2 does not mean that a particular wireless terminal has to participate in all three or even two of the example implementations. FIG. 2 simply indicates the expansive meaning of the term vehicle (V2X) communication and that the technology disclosed herein encompasses vehicle (V2X) communication in all of its various existing and potential implementations.

In sidelink direct communications, a scheduling assignment (SA) is used to indicate the data radio resources that may be used to carry data in a sidelink direct transmission, e.g., to a receiving wireless terminal. As such, there may be one or more pools of scheduling assignment (SA) radio resources that are used to carry the scheduling assignment (SA) information, with the scheduling assignment (SA) resources being different than the data radio resources that are described by the scheduling assignment (SA). The data radio resources typically belong to a data pool (of data radio resources).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe S. That is, one symbol on one sub-carrier in the sub-frame comprises a resource element (RE) which is uniquely defined by an index pair (k, l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

For vehicle direct (V2X) communication certain operations are designed or intended to be common for all V2X modes, e.g., for V2V, V2P, V2I/V2N. In other words, such common mode operations are intended to be usable by most if not all V2X modes substantially without alteration or modification. As a result, most if not all of the parameters used in common mode operations for different V2X modes are essentially the same.

Figure 3A:
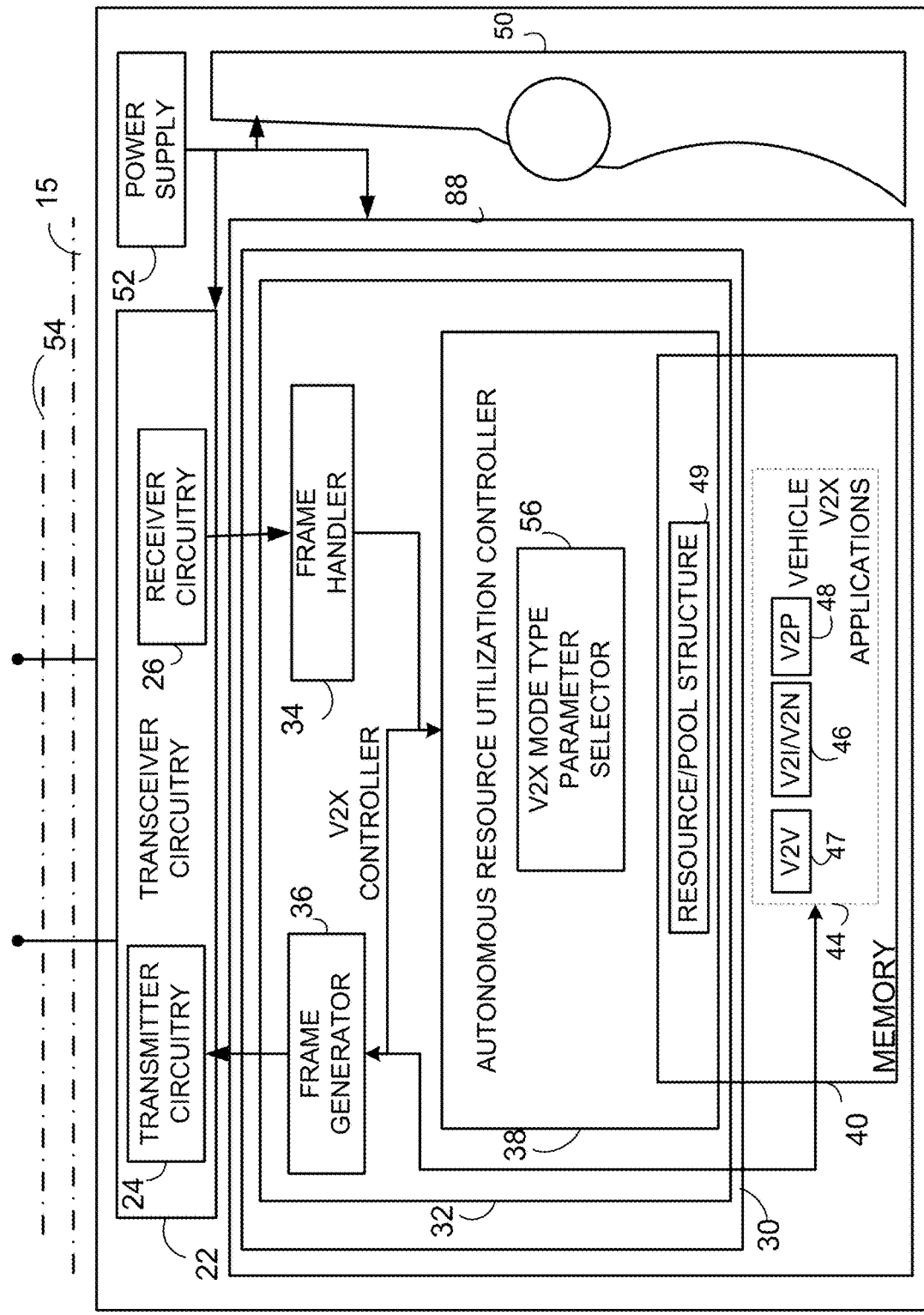
FIG. 3A is a schematic view showing an example, generic wireless terminal which makes a V2X mode type dependent parameter selection for an autonomous resource utilization procedure.

In some of its example aspects the technology disclosed herein, a wireless terminal selects a value of a parameter for use in an autonomous resource utilization procedure based on a particular V2X communications mode type in which the wireless terminal engages. As used herein, "autonomous resource utilization procedure" comprises both pre-resource selection sensing and autonomous resource selection. The selected parameter may have a different value than would a wireless terminal engaged in another V2X communication mode type. FIG. 3A shows various example, representative, non-limiting components and functionalities herein pertinent to a generic wireless terminal 20 configured for such V2X mode type dependent parameter selection.

The wireless terminal 20 comprises transceiver circuitry (TRX) 22, which in turn comprises transmitter circuitry 24 and receiver circuitry 26. The transceiver circuitry 22 includes antenna(e) for the wireless terminal 20. Transmitter circuitry 24 includes, e.g., amplifier(s), modulation circuitry and other conventional transmission equipment. Receiver circuitry 26 comprises, e.g., amplifiers, demodulation circuitry, and other conventional receiver equipment. The transceiver circuitry 22 is configured to use resources allocated for V2X communication, whether those resources be shared with sidelink direct (SLD) communications or separate and distinct for V2X communication as previously described.

The wireless terminal 20 further comprises processor circuitry, also herein known more simply as processor 30. While processor 30 may have responsibility for operation of many aspects of wireless terminal 20 not specifically described herein, in one of its aspects processor 30 serves as a V2X controller 32 for controlling aspects of vehicle (V2X) communication. As further illustrated in FIG. 3A, the V2X controller 32 in turn comprises frame handler 34, frame generator 36, and autonomous resource utilization controller 38.

In addition to the processor circuitry 30, wireless terminal 20 also comprises memory 40 (e.g., memory circuitry) which may store an operating system and various application programs, such as vehicle (V2X) communication applications 44 (including V2I/V2N application 46, V2V (vehicle-to-vehicle) application 47, and V2P (vehicle-to-pedestrian) application 48, discussed above. It should be understood that V2I/V2N application 46 encompasses both V2I/V2N and I2V/N2V communications, and that V2P (vehicle-to-pedestrian) application 48 encompasses both V2P and P2V communications. Indeed, unless otherwise noted, all reference herein to "V2I/V2N" means one or both of V2I/V2N and N2V/I2V. Likewise, unless otherwise noted, all reference herein to "V2P" means one or both of V2P and P2V.

The memory 40 may be any suitable type of memory, e.g., random access memory (RAM), read only memory (ROM), cache memory, processor register memory, or any combination of one or more memory types. The applications such as V2X applications 44 comprise instructions executable by processor circuitry 30 and are stored in non-transient portions of memory 40. Thus, the memory 40 is electronically coupled to processor 30 so that, e.g., processor 30 may access and execute instructions (e.g., from applications or operating system) stored in memory 40 or data stored in the memory 40.

At least some aspects of memory 40 may also be considered as part of V2X controller 32, and as such may host some or all of resource/pool structure 49. The resource/pool structure 49 stores information regarding data radio resources.

The wireless terminal 20 further comprises user interface(s) 50. The user interfaces 50 may comprise one or more suitable input/output devices which are operable by a user. Some of all of the user interfaces 50 may be realized by a touch sensitive screen. The user interface(s) 50 may also comprise a keyboard, audio input and output, and other user I/O devices. Only a portion of the user interfaces 50 is depicted in FIG. 3A, it being understood that the user interfaces 50 may be provided on a cover or case of wireless terminal 50 and thus may visibly obscure the underlying other components shown in FIG. 3A.

The wireless terminal 20 further comprises power supply 52. The power supply 52 may comprise a battery which may provide power to wireless terminal 20 when wireless terminal 20 is not connected to an external power source, and may further comprise circuitry for either utilizing an external power source or recharging the battery of the power supply 52. Power supply 52 is operatively connected to power-utilizing aspects of wireless terminal 20, which include processor 30, transceiver (TRX) 22, and user interface(s) 50 as shown in FIG. 3A.

One major drain on power supply 52 occurs in the transmission of communications across a radio interface, whether it be radio interface 15 (e.g., a P5 interface used for V2X communications) or radio interface 54 utilized for other types of wireless communications (e.g., a Uu interface for communications with one or more base station nodes of a radio access network (RAN), for example). Typically the wireless communications involve data communications which includes, e.g., substantive user data content, and signaling communications. The signaling communications are often used to set up or "control" channels and/or radio resources utilized by the data communications, and as such may constitute a certain amount of "overhead" for facilitating the wireless communications. In several of its aspects, the technology disclosed herein lessens signaling or control communications involved, e.g., in autonomous resource utilization procedures, and thereby both reduces power consumed by wireless terminal 20 and reduces drain on or conserves power supply 52.

The controller 38, which may be realized by processor 30, is herein termed autonomous resource utilization controller 38. As used herein, "autonomous resource utilization procedure" comprises both pre-resource selection sensing and autonomous resource selection. The term "autonomous" as used herein has basis in 3GPP agreements which provide two general modes of operation for a wireless terminal supporting sidelink direct communications. A first mode of operation, originally referred to as "Mode 1", is a scheduled resource allocation mode. A second mode of operation, originally referred to as "Mode 2", is a UE autonomous resource selection mode.

For the scheduled resource allocation mode (e.g., Mode 1) the wireless terminal (UE) needs to be RRC_CONNECTED in order to transmit data. In general, the wireless terminal requests transmission resources from the base station (e.g., an eNodeB also known as "eNB" or a "gNB"). In response to the request, the eNB schedules transmission resources for transmission of Sidelink Control and data. In particular, the wireless terminal sends a scheduling request (D-SR or Random Access) to the eNB followed by a ProSe BSR (buffer status report). Based on the ProSe BSR the eNB can determine that the wireless terminal has data for a ProSe Direct Communication transmission and can estimate the resources needed for transmission. The eNB can then schedule transmission resources for ProSe Direct Communication using a configured sidelink radio network temporary identifier (SL-RNTI).

In the UE autonomous resource selection mode, also known as Mode 2, the wireless terminal (UE) on its own selects resources from resource pools and performs transport format selection to transmit sidelink control and data. If the wireless terminal is out of coverage for ProSe Direct Communication it can only use the UE autonomous resource selection mode. For Mode 2 (the UE autonomous resource selection mode), the wireless terminal has three ways to obtain resource pool information: (1) Broadcast information (through System Information Block (SIB) 18 message) (2) Dedicated RRC signaling (through an RRCConnectionReconfiguration message) (3) Pre-configured information. The wireless terminal then randomly selects resources for transmission from the resource pool indicated by one of the above resource allocation methods.

Thus it is in the sense of autonomous resource selection by wireless terminal 20 that the term "autonomous" is used herein. In particular, in the generic example embodiment and mode shown in FIG. 3A, the autonomous resource utilization controller 38 is shown as comprising V2X mode type dependent parameter selector 56. The V2X mode type dependent parameter selector 56 serves, e.g., to select, based on a particular V2X mode type, a parameter to use in an autonomous resource utilization procedure wherein the wireless terminal selects radio resource(s) for use in a V2X communication of a particular V2X mode type. That is, the V2X mode type dependent parameter selector 56 selects a value for a parameter to use for the autonomous resource utilization procedure in accordance with the particular one of the V2X mode types that is to be used by the wireless terminal 20 in the wireless communication. In other example embodiments and modes illustrated herein, although labeled as a V2X mode type dependent parameter selector 56, the element may instead serve as a V2X mode type dependent generator.

As mentioned above, V2X mode types are generically referred to as "V2X" and include the example modes types of V2V, V2P, and V2I/V2N. In a generic example embodiment and mode of the wireless terminal 20 of FIG. 3A, the "particular one" of the V2X mode types may be any one of the possible V2X modes, including V2V, V2P, and V2I/V2N, to the exclusion of the other modes, depending on how the wireless terminal is being used, e.g., in a vehicle, on a person, situated at infrastructure.

In at least some of the example embodiments and modes described herein, the "particular one" of the V2X mode types is the vehicle-to-pedestrian/pedestrian-to-vehicle (V2P/P2V) mode. As used herein "V2P" may be and generally is used to refer to one or both of V2P and P2V. Thus, in such V2P/P2V example embodiments and modes, the V2X mode type dependent parameter selector 56 makes a choice, based on the fact that the V2P/P2V mode type is used, of a parameter to use in an autonomous resource utilization procedure. The parameter/parameter value selected by V2X mode type dependent parameter selector 56 thus may be selected for the V2P/P2V mode type in view of its particular or even unique applicability to the V2P/P2V mode type, as opposed to a parameter or parameter value which may be generally associated another V2X mode type or even with plural V2X mode types. Thus the parameter/parameter value selected by V2X mode type dependent parameter selector 56 may be selected for the V2P/P2V mode type is different from either (1) a parameter/parameter value that is associated with a V2X mode type other than the particular V2X mode type, or (2) a common value which heretofore was applicable to all V2X mode types. The parameter is preferably chosen for its power conserving benefit for operation in the V2P/P2V mode.

Figure 4A:
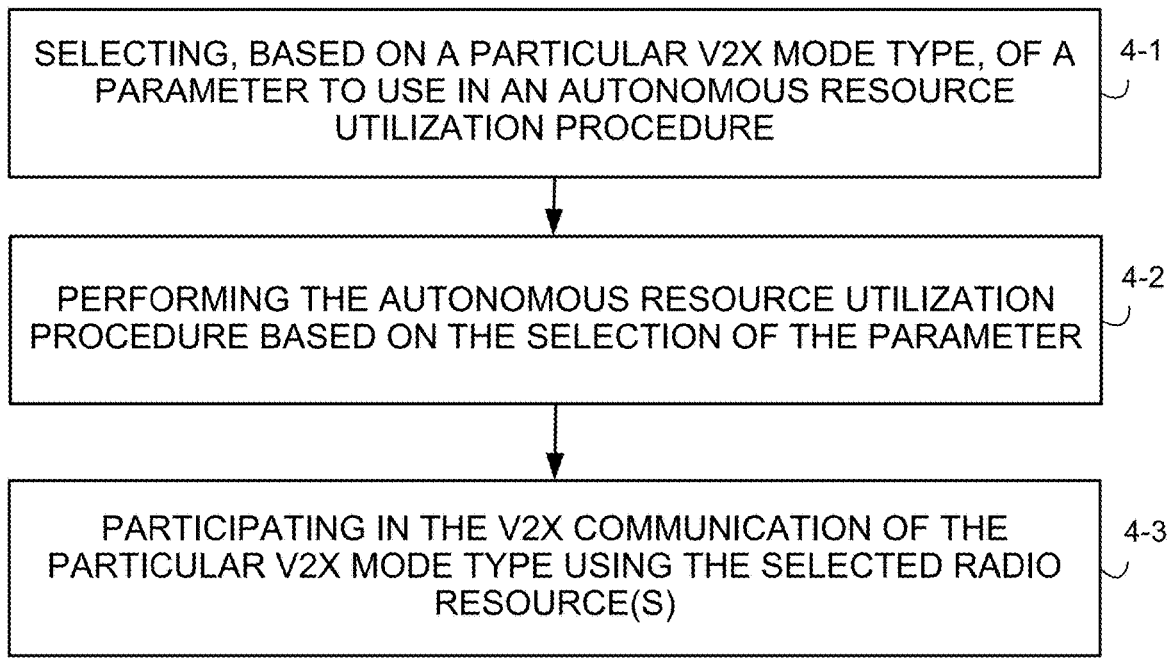
FIG. 4A is a flowchart showing example, representative, basic acts or steps performed by the wireless terminal of FIG. 3A.

FIG. 4A thus illustrates basic, example acts or steps involved in a method of operating the wireless terminal 20 of FIG. 3A, including utilization of autonomous resource utilization controller 38 in particular. Act 4-1 comprises making a choice, based on a particular V2X mode type, of a parameter to use in an autonomous resource utilization procedure. As understood from the foregoing, in an autonomous resource utilization procedure the wireless terminal, rather than a radio network, selects radio resource(s) for use in a V2X communication of the particular V2X mode type. Act 4-1 may be performed by the autonomous resource utilization controller 38. Act 4-2 comprises performing the autonomous resource utilization procedure based on the selection of the parameter. Various aspects of an autonomous resource utilization procedure are described further herein. Act 4-2 may be performed by V2X controller 32. Act 4-3 comprises participating in the V2X communication of the particular V2X mode type over a radio interface using the selected radio resource(s). Act 4-3 may be performed by transceiver (TRX) 22 and the V2X communication of the particular V2X mode type may be over interface 15.

Figure 3B:
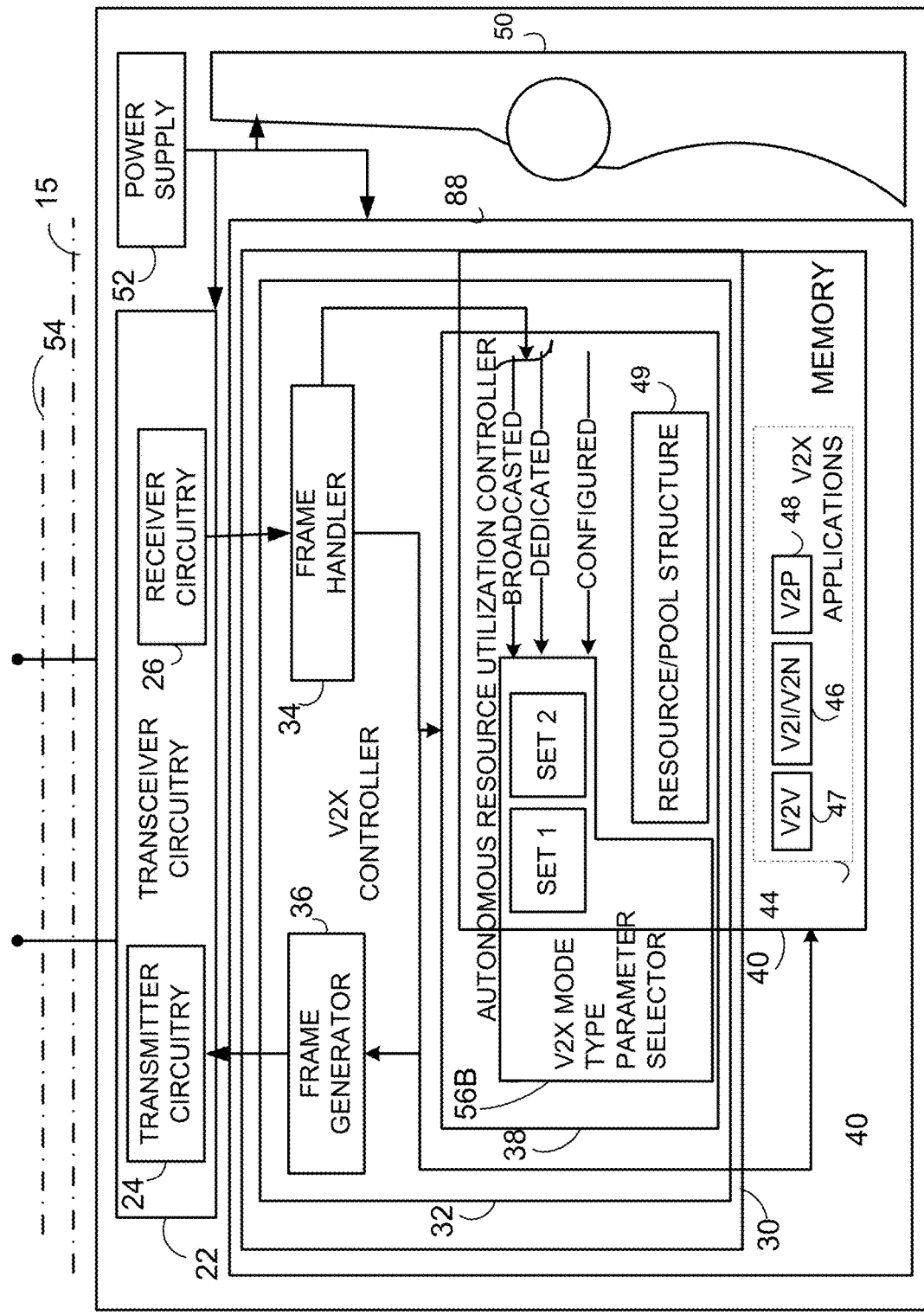
FIG. 3B is a schematic view showing an example wireless terminal which is a variation of the wireless terminal of FIG. 3A and which makes a V2X mode type dependent parameter selection between plural sets of parameters.

FIG. 3B shows a variation of the wireless terminal 20 of FIG. 3A. Unless otherwise noted, the units and functionalites of the wireless terminal 20B of FIG. 3B, have same suffixes have same or essentially similar structure and operation as comparably suffixed units and functionalities of FIG. 3A. The wireless terminal 20B of FIG. 3B further shows V2X mode type dependent parameter selector 56B as being configured to make the selection of a first set of parameters (set 1) and a second set of parameters (set 2) for use in the autonomous resource utilization procedure. In the FIG. 3B example embodiment and mode, the second set of parameters is configured for use in the autonomous resource utilization procedure for operation in the particular V2X mode type. As shown in FIG. 3B, one or more of the first set of parameters (set 1) and the second set of parameters (set 2) may be obtained from a radio network (e.g., from a base station or access node) by either broadcast or by dedicated signaling, or may be configured (e.g., pre-configured in memory 40) at wireless terminal 20B. In terms of "broadcast", the first set of parameters (set 1) and the second set of parameters (set 2) may be obtained from system information broadcasted from a base station node of a radio access network (RAN), e.g., from a system information block (SIB).

Figure 3C:
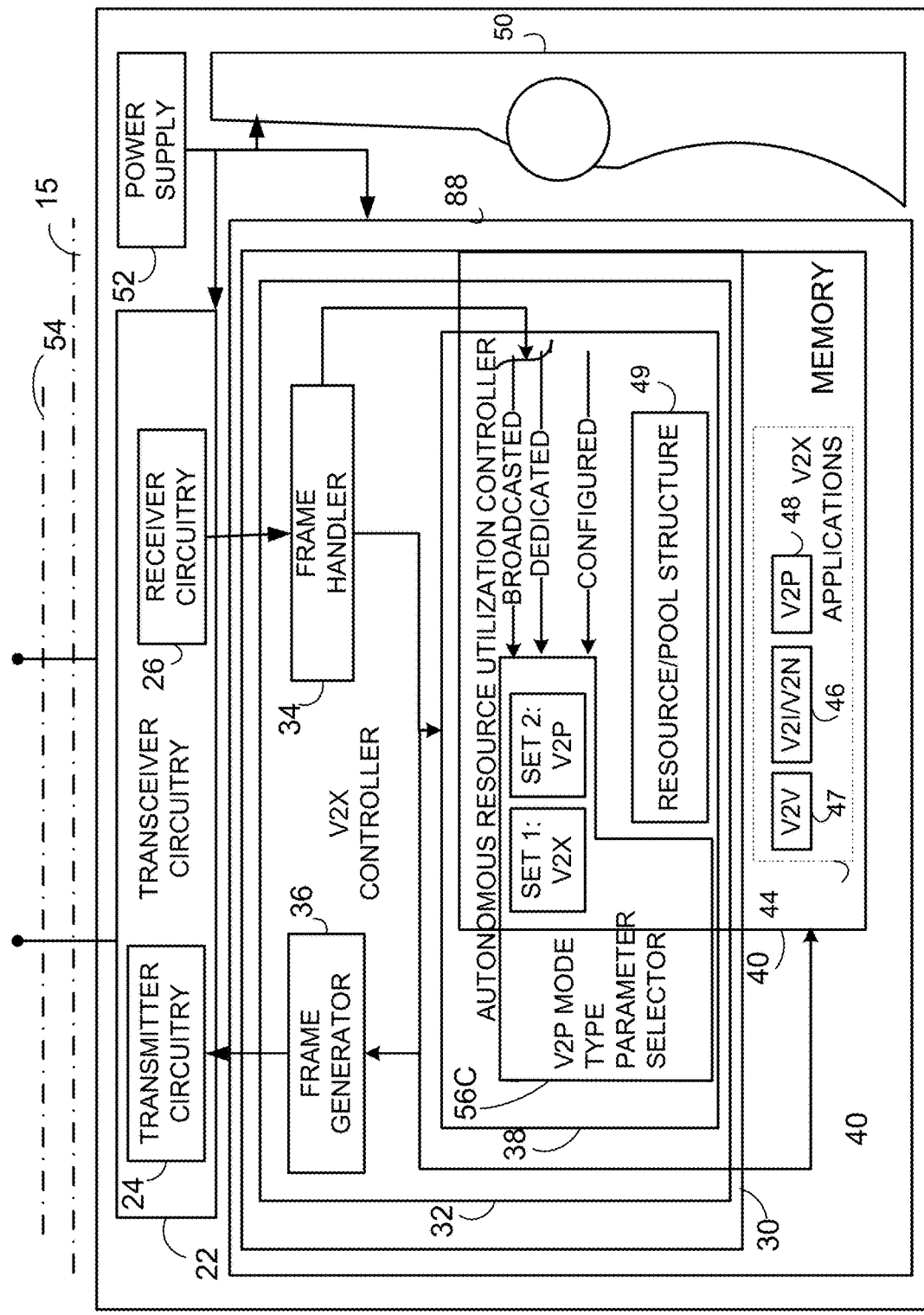
FIG. 3C is a schematic view showing an example wireless terminal which is a variation of the wireless terminal of FIG. 3B and which makes a V2P mode type dependent parameter selection between plural sets of parameters.

FIG. 3C shows a particular implementation of the example embodiment and mode of FIG. 3B in which the second set of parameters is configured for use in the autonomous resource utilization procedure for power-saving operation in the particular V2X mode type, and the particular V2X mode type is the V2P/P2V mode type. In the FIG. 3C implementation the first set of parameters is configured for use in the autonomous resource utilization procedure for operation in either (1) a V2X mode type other than the particular V2X mode type (e.g., for V2V mode type, for example) or (2) plural V2X mode types (e.g., common for plural V2X mode types, possibly including a legacy V2P mode). Thus, in FIG. 3C the V2X mode type dependent parameter selector 56C is labeled as V2P/P2V mode type dependent parameter selector 56C. The first set of parameters is labeled as "set 1: V2X" to indicate that the parameters of the first set may be used for plural types of V2X modes (or for a V2X mode type other than V2P), while the second set of parameters is labeled as "set 2: V2P" to reflect particular suitability or applicability to the V2P/P2V mode type (as opposed, e.g., to a common V2X parameter).

FIG. 4B(1) and FIG. 4B(2) shows example, basic acts or steps of two alternative scenarios that may be performed by wireless terminals such as those of FIG. 3A, FIG. 3B or FIG. 3C when the V2X mode type dependent parameter selector 56 is configured check availability of a set of parameters particularly configured for the particular V2X mode type.

In the scenario of FIG. 4B(1), act 4-1-B(1)-1 comprises checking availability of a set of parameters particularly configured for the particular V2X mode type. If it is determined at act 4-1-B(1)-1 that the set of parameters particularly configured for the particular V2X mode type is available, as act 4-2-B(1)-1 the set of parameters particularly configured for the particular V2X mode type is used as the selected parameter for the autonomous resource utilization procedure. On the other hand, if it is determined at act 4-1-B(1)-1 that the set of parameters particularly configured for the particular V2X mode type is not available, as act 4-2-B(1)-2 another set of parameters associated with at least one other V2X mode type is used as the selected parameter for the autonomous resource utilization procedure.

In the scenario of FIG. 4B(2), act 4-1-B(2)-1 comprises checking availability of a set of parameters particularly configured for the particular V2X mode type. If it is determined at act 4-1-B(2)-1 that the set of parameters particularly configured for the particular V2X mode type is available, as act 4-2-B(2)-1 the set of parameters particularly configured for the particular V2X mode type is used as the selected parameter for the autonomous resource utilization procedure. On the other hand, if it is determined at act 4-1-B(2)-1 that the set of parameters particularly configured for the particular V2X mode type is not available, as act 4-2-B(2)-2 the autonomous resource utilization controller 38 randomly selects a radio resource(s) to use as the selected parameter for the autonomous resource utilization procedure, e.g., without engaging in any resource sensing operation or the like.

Figure 5:
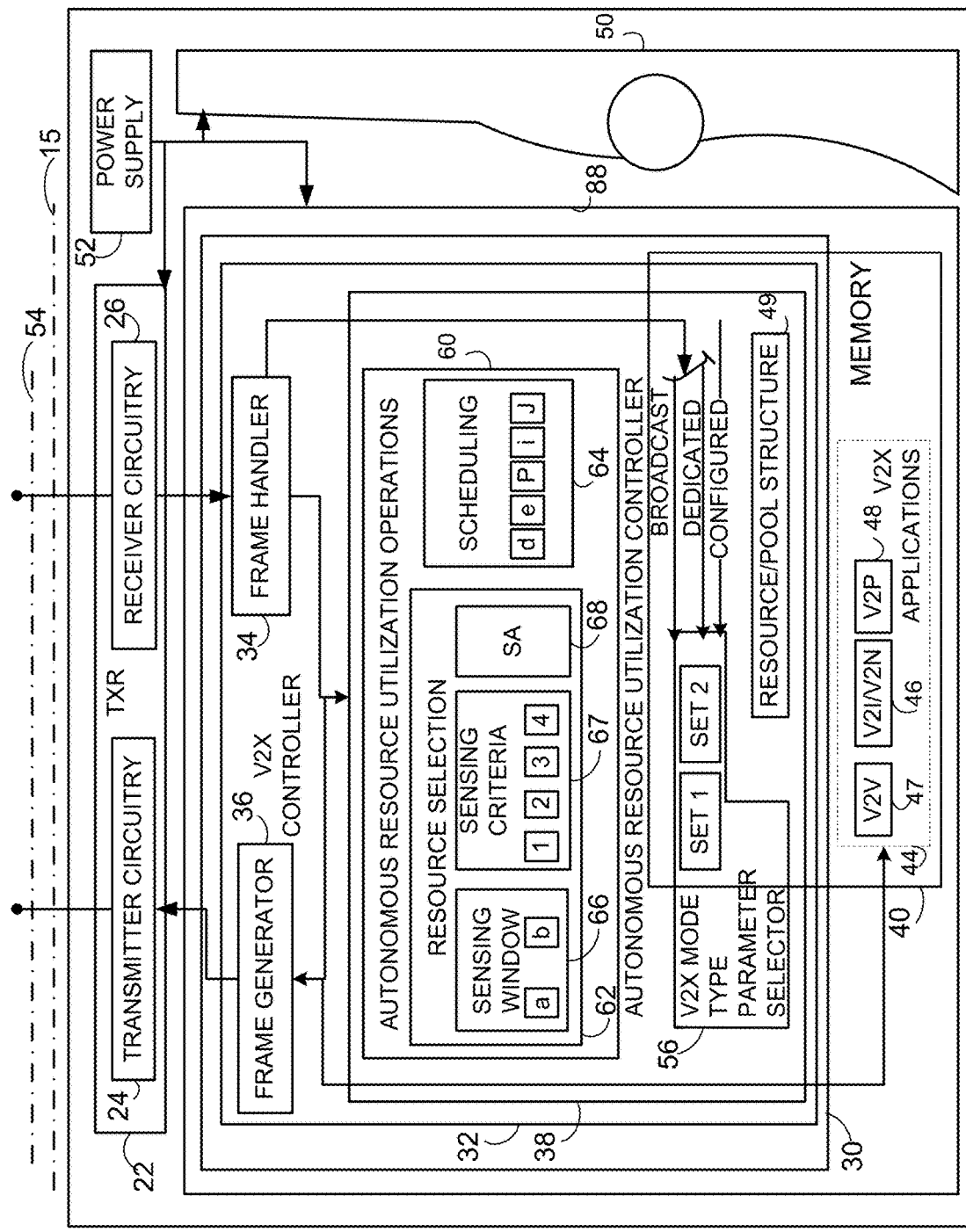
FIG. 5 is a schematic view showing example details of an autonomous resource utilization controller suitable for use with wireless terminals of embodiments hereof including those of FIG. 3A, FIG. 3B, and FIG. 3C.

FIG. 5 shows in more detail certain aspects of various wireless terminals provided in accordance with the technology disclosed herein, such as various implementations of the wireless terminals of the example embodiments and modes of FIG. 3A, FIG. 3B, and FIG. 3C. In particular FIG. 5 shows in more detail certain aspects of how autonomous resource utilization controller 38 executes autonomous resource utilization procedure 60, as well as certain operations comprising the autonomous resource utilization procedure 60. It should be understood that the autonomous resource utilization procedure 60 may comprise or be realized by processor 30 executing coded instructions stored on non-transient media.

FIG. 5 further shows autonomous resource utilization procedure 60 as comprising resource selection procedure 62 and scheduling procedure 64 (also known as SPS allocation window operation 64). Thus, as mentioned before, the autonomous resource utilization procedure comprises both pre-resource selection sensing and autonomous resource selection. The resource selection procedure 62 in turn comprises sensing window procedure 66, sensing criteria selection procedure 67, and scheduling assignment (SA) procedure 68. Each of the foregoing procedures may also be termed as "operations".

FIG. 5 also shows one or more parameters within the blocks which represent scheduling procedure 64, sensing window procedure 66, and sensing criteria selection procedure 67. The parameters illustrated within the procedures depicted in FIG. 5, and the autonomous resource utilization procedure 60 itself, are understood with reference to FIG. 6. In the autonomous resource utilization procedure 60 of FIG. 6, resource selection/reselection is performed at TTI/subframe n. The act of resource selection/reselection, performed by resource selection procedure 62, essentially reserves resources from a scheduling assignment (SA) resource pool for SA information transmission. Once selected, the scheduling assignment (SA) is transmitted on the Physical Sidelink Control Channel (PSCCH) at TTI/subframe n+c.

Figure 6:
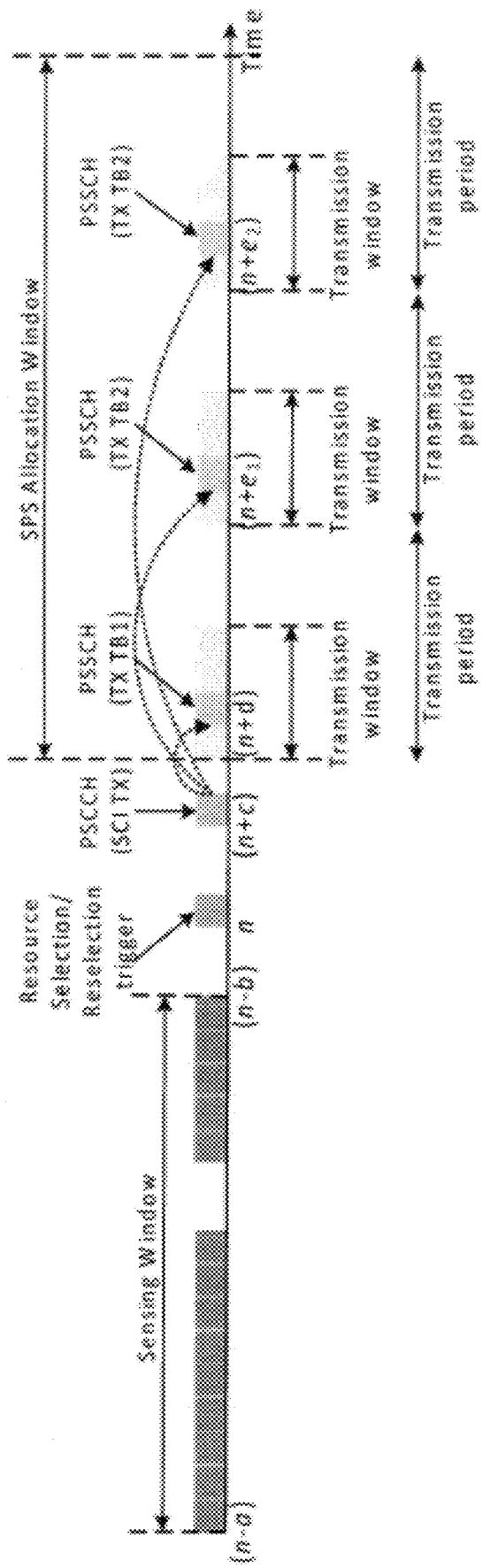
FIG. 6 is a diagrammatic view showing example aspects of an autonomous resource utilization procedure according to certain example embodiments and modes.

Before selection/re-selection of radio resource, in a "sensing window" of FIG. 6 the sensing window procedure 66 of the wireless terminal senses availability of transmission resources. Basically, during the sensing window the sensing window procedure 66 of the wireless terminal checks which resources are occupied or reserved by other wireless terminals. As shown in FIG. 6, for a common mode resource procedure the "size" of the sending window is dependent on the values of "a" and "b". Historically both the "a" and "b" values in V2V communications have been fixed and common values for all wireless terminals for V2V, as described by R1-165740. R1-165740 specifically states that the values of a and b are fixed; that b>0; that "The values a and b are common for V2V UEs"; that a=1000+b. But in at least some of the example embodiments and modes of the technology disclosed herein, and as illustrated by arrows 7A-a and 7A-b in FIG. 7A, the parameter selected by the V2X mode type dependent parameter selector 56 is related to an endpoint of a resource sensing window of the resource selection operation, e.g., affects the value of "a" and/or "b", and thus affects the size of the sensing window.

Regarding sensing windows historically, R1-165740 specifically states "that all the decoded SA transmissions in TTI [n−a, n−b) are taken into account; and that a decoded SA which is associated with data transmissions in data resource(s) at any TTI [n−a, n−b) and transmitted earlier than TTI n−a is taken into account. But in certain example embodiments and modes described herein, the behavior or criteria used for sensing during the sensing window is not fixed nor uniform for all V2X modes.

In the above regard, during the sensing window the sensing window procedure 66 of the wireless terminal checks which resources are occupied or reserved by other wireless terminals. Historically a sensing window operation may be conducted on the basis of certain common or default behaviors or criteria, among which are the following:

both scheduling assignment decoding and resource energy measurement are to be used as the selection criteria in the resource selection operation;

only scheduling assignment decoding is to be used as the selection criteria in the resource selection operation;

scheduling assignment decoding for only selected other wireless terminals is to be used as the selection criteria in the resource selection operation;

only resource energy measurement are to be used as the selection criteria in the resource selection operation.

no sensing behavior.

As used above and herein, resource energy measurement refers to power/energy measurement of candidate resources during the sensing window, and scheduling assignment decoding refers to decoding the scheduling assignment(s) (SA) of other wireless terminals. The scheduling assignment(s) (SA) may also be called sidelink control information (SCI).

Figure 7A:
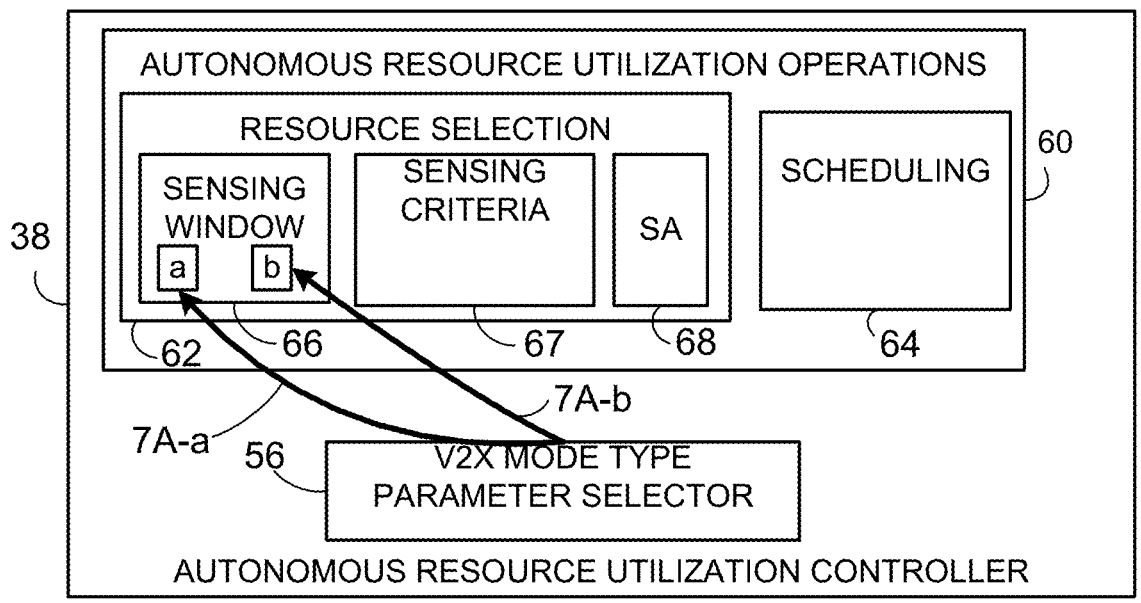
FIG. 7A is a schematic view of portions of an autonomous resource utilization controller of the embodiment of FIG. 6 and further illustrating selection of a parameter for a sensing window procedure.
Figure 7B:
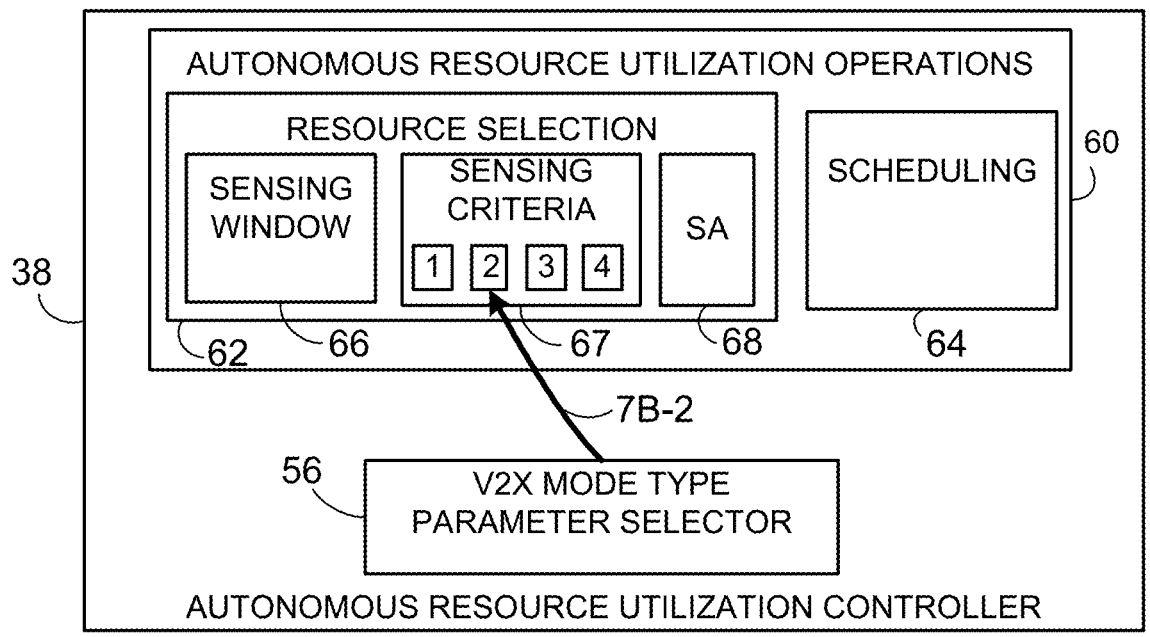
FIG. 7B is a schematic view of portions of an autonomous resource utilization controller of the embodiment of FIG. 6 and further illustrating selection of a parameter for a sensing criteria selection procedure.

In certain example embodiments and modes described herein the manner in which such sensing is performed by the sensing window procedure 66 may be controlled by sensing criteria selection procedure 67. That is, the sensing criteria selection procedure 67 may prescribe the behavior of the sensing mechanisms and protocol employed by the wireless terminal in performing the sensing in dependence on the particular V2X mode type. In certain example embodiments and modes described herein, the parameter(s) selected by V2X mode type dependent parameter selector 56 pertains to sensing behavior or sensing criteria imposed by sensing criteria selection procedure 67 for the performance of the sensing window procedure 66, and are dependent on the V2X mode type of the wireless terminal. Such parameters related to differing sensing behavior or sensing criteria are illustrated in FIG. 5 and FIG. 7B as Behavior/Criteria Parameters 1-4 (shown in correspondingly labeled boxes within sensing criteria selection procedure 67).

Behavior/Criteria Parameter 1: A certain default behavior for the particular V2X mode type (one of the above 5 default versions), which means the particular V2X mode type always use one of the 5 above versions of sensing.

Behavior/Criteria Parameter 2: A behavior or criteria based on the particular V2X mode type battery information. Such behavior or criteria may be signaled from a higher layer, e.g., an application layer, to lower layer as sensing assistant information.

Behavior/Criteria Parameter 3: A behavior or criteria based on eNB's information or higher layer information, telling the particular V2X mode type UE which sensing behaviors should be used. It could be explicit information, e.g., broadcasted, or dedicated, or pre-configured information from eNB to UE, or RRC signaling from higher layers; or it could be also implicit information from eNB or higher layers, which provides information for UE sensing assistant, such as low UE density around the pedestrian UE, e.g., at midnight there are very few UEs, no matter pedestrian UE or vehicle UE on the street, in this case, the UE including both pedestrian UE and vehicle UE does not need sensing at all, especially for power limited pedestrian UEs.

Behavior/Criteria Parameter 4: A behavior or criteria based on UE's own congestion level measurement, where the metric of measurement for congestion level could be similar to the channel busy ratio (CBR) defined in ETSI (see, e.g., Intelligent Transport Systems (ITS); Cross Layer DCC Management Entity for operation in the ITS G5A and ITS G5B medium, ETSI TS 103 175, V1.1.1 (2015 June), or any other metric performing the function of frequency and/or time resource usage congestion level indication. If the pedestrian UE's measure shows the congestion level is low or no congestion at all, then no sensing is needed.

If the sensing behaviors of pedestrian UEs are not by default defined (e.g., Behavior/Criteria Parameter 1), then either Behavior/Criteria Parameter 2, or Behavior/Criteria Parameter 3, or Behavior/Criteria Parameter 4, or any combination of, or all of Behavior/Criteria Parameter 2, Behavior/Criteria Parameter 3, and Behavior/Criteria Parameter 4 may be used by the particular V2X mode type UE to determine sensing behaviors.

FIG. 7B shows that V2X mode type dependent parameter selector 56 may set one of the parameters Behavior/Criteria Parameter 1—Behavior/Criteria Parameter 4 for the sensing criteria selection procedure 67, and in particular by arrow 7B-2 shows a situation in which V2X mode type dependent parameter selector 56 happens to be setting Behavior/Criteria Parameter 2. For other scenarios other parameters may instead be set, e.g., one of parameters Behavior/Criteria Parameter 1, Behavior/Criteria Parameter 3, or Behavior/Criteria Parameter 4, or combination of one or more such parameters.

In FIG. 6, the scheduling assignment (SA) at TTI n+c indicates the associated data which is transmitted at TTI n+d (d>=c), where c and d are integers. For the scheduling procedure 64, semi-persistent scheduling (SPS) is used in wireless terminal autonomous resource selection, so one scheduling assignment (SA) can schedule multiple transport block (TB) transmissions with reusing the frequency resources in different TTI/subframe, e.g., at TTI n+e1, TTI n+e2 . . . . There are some limitations, e.g., due to sidelink transmission half duplex property, the wireless terminal skips sensing at least on the subframes used for its own transmissions.

Figure 7C:
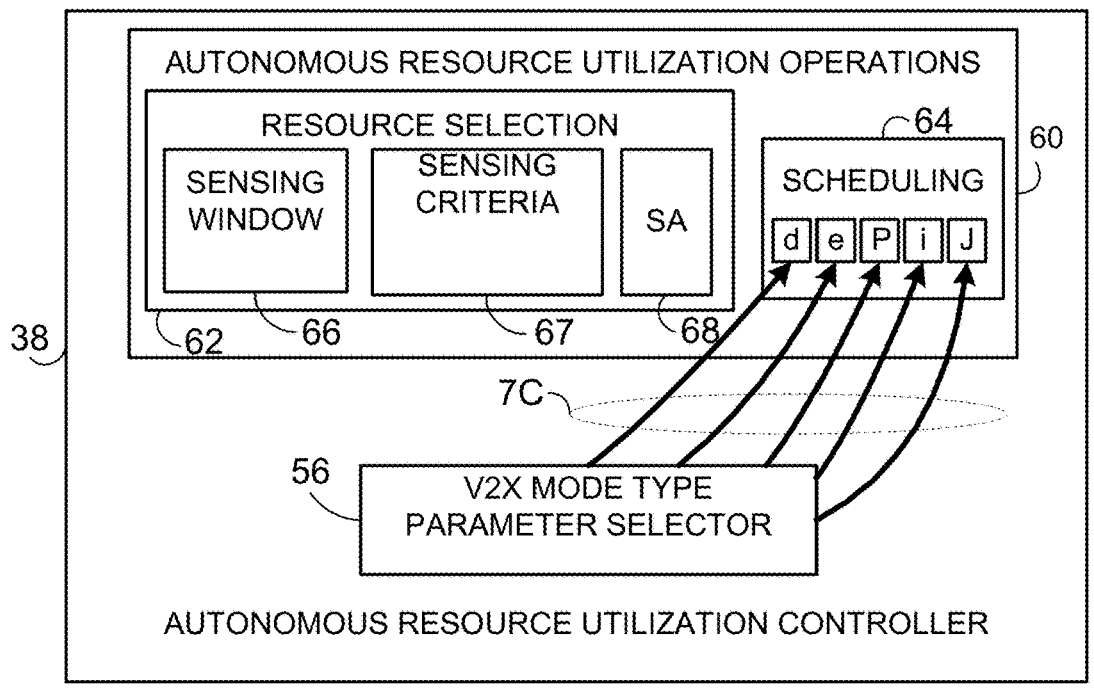
FIG. 7C is a schematic view of portions of an autonomous resource utilization controller of the embodiment of FIG. 6 and further illustrating selection of a parameter for a scheduling procedure.

Historically the parameters d, e, P, i and j for the scheduling procedure 64 shown in FIG. 6 and depicted both in FIG. 5 and FIG. 7C have had fixed values for all V2X communications for all V2X modes. Historically those fixed values have been prescribed as $e=d+P*j$ for $j=i, 2*i, \ldots, J*I$, and $P=100$. But in certain example embodiments and modes described herein, one or more of the parameters of the scheduling procedure 64 (e.g., one or more of d, e, P, i and j) are selected by the V2X mode type dependent parameter selector 56 on the basis of the particular V2X mode type to be used in the V2X communication.

In the above regard, in conjunction with FIG. 6 above it was mentioned that certain functions are related to parameters "d" and "e", while "$e=d+P*j$ for $j=i, 2*i, \ldots, J*i$, and $P=100$" means the parameters P, i and J are also related. Therefore, if a smaller P value is allocated to pedestrian UEs, the scheduling frequency increases. Additionally or alternatively, if a larger J value is allocated to pedestrian UEs, then the SPS allocation window size increases. Therefore, one, or some, or all of the parameters in the set (d, e, P, i, J) for pedestrian UEs are newly defined by the V2X mode type dependent parameter selector 56 based on the particular V2X mode type.

Thus, in one example implementation a size of a transmission window in which semi-persistent scheduling of the particular V2X mode transmission occurs is dependent on the parameter selected by the V2X mode type dependent parameter selector 56. Additionally or alternatively, a frequency at which semi-persistent scheduling of the particular V2X mode transmission occurs is dependent on the parameter the parameter selected by the V2X mode type dependent parameter selector 56.

Figure 7D:
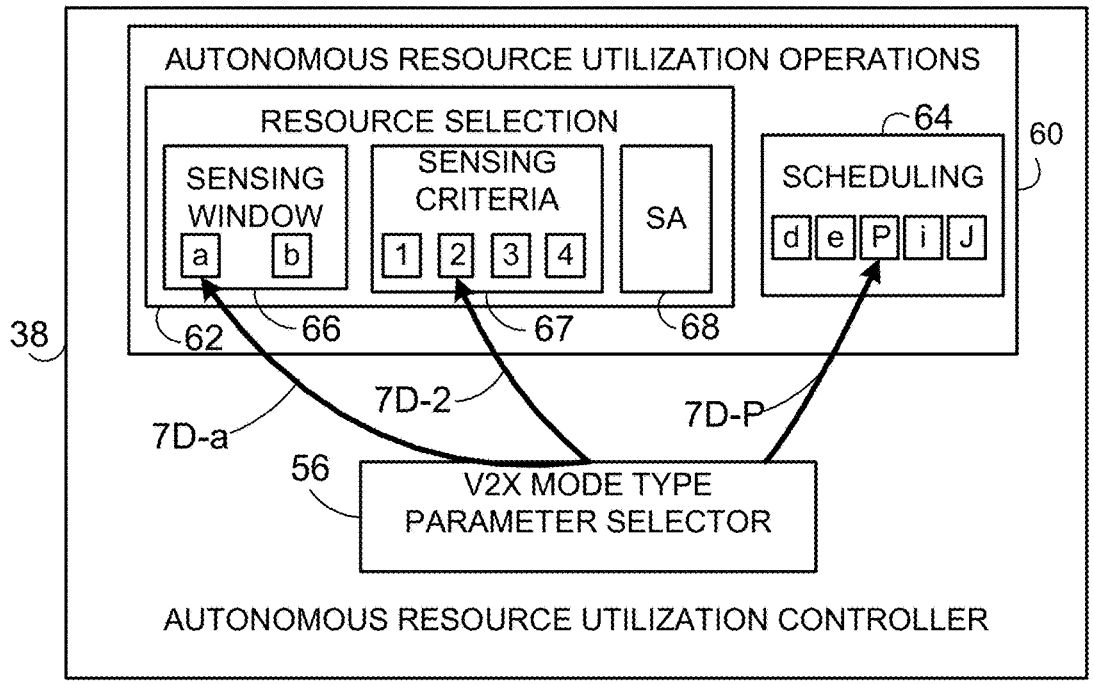
FIG. 7D is a schematic view of portions of an autonomous resource utilization controller of the embodiment of FIG. 6 and further illustrating selection of parameters for plural procedures comprising an overall autonomous resource utilization procedure.

In some example embodiments and modes, parameter selection is not confined to one parameter or to one type of resource procedure (e.g., not confined to only one of sensing window procedure 66, sensing criteria selection procedure 67, or scheduling procedure 64). For example, and as shown by FIG. 7A, the V2X mode type dependent parameter selector 56 may select plural parameters utilized by any one procedure of the autonomous resource utilization procedure 60. Additionally or alternatively, and as shown by FIG. 7D, the V2X mode type dependent parameter selector 56 may select one or more parameter(s) for plural procedures of the autonomous resource utilization procedure 60. For example, arrows 7D-a, 7D-2, and 7D-P in FIG. 7D show the V2X mode type dependent parameter selector 56 as selecting V2X mode type dependent parameters for plural procedures, e.g., arrow 7D-a for parameter "a" of sensing window procedure 66, arrow 7D-2 for parameter "2" of sensing criteria selection procedure 67, and arrow 7D-P for parameter "P" of the scheduling procedure 64.

Figure 8:
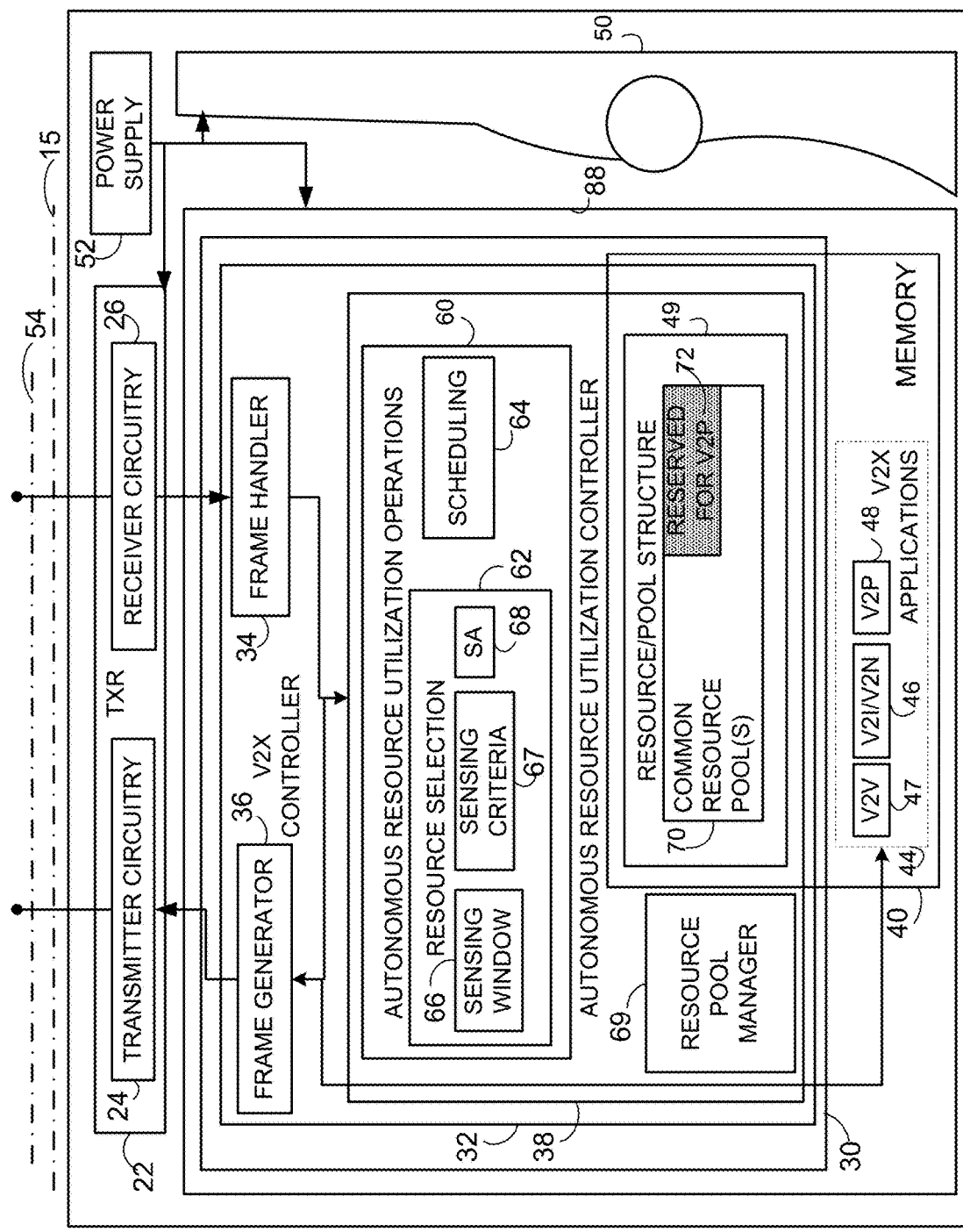
FIG. 8 is a schematic view showing an example wireless terminal which reserves, from a common resource pool, a radio resource(s) for use by communications of a particular V2X mode type.

FIG. 8 shows an example embodiment and mode of a wireless terminal 20(8) which manages radio resources in a power saving manner for use in particular V2X mode type communications. Elements, units, and functionalities of the wireless terminal 20(8) of FIG. 8 which have the same reference numerals as other embodiments and modes described herein are understood to have similar structure and operation as described with reference to correspondingly number or labeled elements of the other embodiments. FIG. 8 further shows that resource/pool structure 49, which may be hosted in memory 40, defines at least a common resource pool(s) 70. The common resource pool(s) 70 is said to be common in the sense that the radio resources comprising the pool(s) 70 are generally available for use in all modes of V2X communication, e.g., V2V, V2I/V2N, and V2P, as those modes are properly scheduled. In the example embodiment and mode of FIG. 8 the V2X mode type dependent parameter selector 56 may take the form of or be replaced by resource pool manager 69.

As used herein, a resource "pool" may be one pool comprising plural radio resources, or may comprise plural such pools. For this reason (that a pool may itself comprise other pools or sub-pools) the common resource pool of the resource/pool structure 49 is sometimes described as common resource pool(s) 70. Thus, the wireless terminal 20(8) of FIG. 8 comprises electronic memory circuitry configured to store a description of a common resource pool(s) of radio resources ordinarily available for use in communications of plural V2X modes types. The processor circuitry of wireless terminal 20(8), e.g., processor 30 and V2X controller 32 with its resource pool manager 69 in particular, is electronically coupled to the electronic memory circuitry.

Acts performed by the wireless terminal 20(8) in conjunction with execution of the autonomous resource utilization procedure 60(8) are illustrated in FIG. 9. In executing the autonomous resource utilization procedure 60 the processor 30 of the wireless terminal 20(8) selects and schedules radio resource(s) for a communication of a particular V2X mode type, such as for a V2P/P2V mode type communication, for example. Act 9-1 comprises selecting the radio resource(s) for the particular V2X mode type communication. Act 9-1 thus may comprise, e.g., acts involved in sensing window procedure 66 and even sensing criteria selection procedure 67, and may include those described before with respect to other embodiments and modes, by way of example.

In view of the fact that the communication is for the particular type of V2X communication (e.g., V2P), the processor 30 does not schedule radio resource(s) in the manner as would be done for V2X mode type communications other than the particular V2X mode type. Act 9-2 comprises processor 30 and scheduling assignment (SA) procedure 68 in particular generating a scheduling assignment signal which informs of allocation of the selected resource(s) to be used for data transmission for the communication of the particular V2X mode type. But in the example embodiment and mode of FIG. 8 the selected radio resource(s) are not only scheduled, but are also reserved (e.g., by resource pool manager 69) for further use by the scheduling wireless terminal for the particular V2X mode type communication. In this regard, act 9-3 comprises "reserving" the selected radio resource(s) for use by the wireless terminal in scheduling semi-persistent transmissions of data for the communication of the particular V2X mode type. The "reservation" of the selected resource(s) is for use by the wireless terminal in the scheduling of the semi-persistent transmissions of the data for the communication of the particular V2X mode type is generally to the exclusion of any other communications, thereby precluding other communications (including other V2X modes types) from allocating or using the reserved radio resource(s) during the duration of the reservation (unless the scheduling assignment permits pre-emption of the reserved radio resource(s) for a specified reason or condition, or unless the resource reselection is triggered for a specified reason or condition, or unless the UE autonomously releases the resource(s) for a specified reason or condition).

FIG. 8 shows in stippled fashion an example radio resource(s) 72 that is selected and reserved for use by a communication of the particular V2X mode type. In an example implementation, the particular V2X mode type is a vehicle-to-pedestrian/pedestrian-to-vehicle (V2P/P2V) mode, and the labeling of reserved radio resource(s) 72 in FIG. 8 reflects such V2P/P2V mode type implementation.

As previously described, the semi-persistent transmissions comprises periodic use of the selected and reserved resource(s) 72 over a transmission time window. During such reservation all of the semi-persistent transmissions of the data for the communications of the particular V2X mode type are based on the same scheduling assignment signal (e.g., on the same scheduling assignment (SA)).

The duration for which the "reservation" of the selected radio resource(s) occurs is a time period longer than would otherwise be for a single call or communication, and thus may encompass plural calls or sessions. The reservation duration may be for a predetermined time period, or be for a predetermined number of TTI transmissions, or be for no limitation until the UE autonomously stops transmission, or being triggered by resource reselection, or pre-empted by other services. After the reservation of act 9-3 the reserved radio resource(s) 72 is released back to the common pool for use by other communications, including other V2X mode type communications.

In one example implementation the reservation of radio resource(s) for the particular V2X mode type, e.g., V2P/P2V mode type, may be realized by increasing the SPS allocation window size (see FIG. 6) for the particular V2X mode type only (e.g., for V2P/P2V mode type only). By increasing the window size one scheduling assignment (SA), generated by scheduling assignment (SA) procedure 68, can schedule more pedestrian UE data transmissions (e.g., more P-UE transport blocks (TB)).

The extreme case of resource reservation is that some frequency resources are forever reserved and reused for pedestrian UEs, and will never be shared by vehicle UEs. Such extreme case of forever reservation is similar to dedicated resource pool(s) for pedestrian UEs, with a difference being that the pedestrian UE can drop or "unreserve" the formerly reserved resources so that the formerly reserved but now un-reserved resources can be shared by other vehicle UEs. The fact that a reserved radio resource(s), of any duration, can be "un-reserved" or "released", and conditions for such release, may be explicit indicated in the scheduling assignment (SA) signal associated with the radio resource(s). Other types of wireless terminals, e.g., wireless terminals engaging in communications of V2X mode types other than the particular V2X mode type, can during their own sensing period thereby decode the SA information of the pedestrian UEs and know the other type of wireless terminals may, under the conditions prescribed in the scheduling assignment (SA), also use the reserved resources. In this respect, the reservation of radio resource(s) for the particular V2X mode type may be conditioned in duration, e.g., terminate under certain conditions, and thus be viewed as a conditioned duration reservation.

The resource reservation technology for the particular V2X mode type as described with reference to FIG. 8 and FIG. 9 may also be implemented with and/or used in conjunction with other features described herein. For example, the processor 30 may determine a particular parameter affecting size of a transmission time window, in which the semi-persistent transmissions of the data for the communication of the particular V2X mode type occurs, in dependence on the particular V2X mode type. For example, if a smaller P value is allocated to for the wireless terminal (see FIG. 7C), the scheduling frequency increases.

Alternatively or additionally, the processor circuitry may determine a frequency at which the semi-persistent transmissions of the data for the communication of the particular V2X mode type occurs in dependence on the particular V2X mode type. That is, the processor 30 may increase the scheduling frequency of data TB transmissions for the particular V2X mode type only so that, if using the same SPS allocation window size, one scheduling assignment (SA) can schedule more data TB transmissions for the particular V2X mode type. For example, if a larger J value is allocated to the particular V2X mode type wireless terminal (e.g., a pedestrian UE), then the SPS allocation window size increases.

The processor 30 may also increase both the SPS allocation window size and scheduling frequency data TB transmissions for the particular V2X mode type wireless terminal (e.g., the P-UE).

In an aspect of the technology disclosed herein, the processor 30 may include an indication of the size of a transmission time window in a scheduling assignment (SA) signal, and/or an indication of the scheduling frequency data in the scheduling assignment (SA) signal.

Using the V2P/P2V mode type as an example of the particular V2X mode type, it should be apparent that one, or some, or all of the newly defined pedestrian UE SPS allocation related parameters may be allocated to the UE by one, or some combinations, or all combinations of the methods (1) broadcasted to the UE in SIB information (2) dedicated signal to the UE in RRC signaling (3) preconfigured in the UE. Furthermore, when pedestrian UE transmits SA information, one, or some, or all of the newly defined pedestrian UE SPS allocation related parameters is included in SA information to let other UEs, including vehicle UEs, know the resource allocation/reservation situations.

Moreover, as explained with example reference to FIG. 3B above, the wireless terminal may receive two or even more (e.g., for other UE/service type or priority type) sets of parameters related to SPS configurations. The set of parameters defined for a V2X mode type other than the particular V2X mode type, or for plural V2X modes types, may be referred to as the first set parameters; the set of parameters defined for V2P/P2V communications or pedestrian UEs may be referred to as the second set of parameters. Using such nomenclature, the UE behaviors are defined below:

If the UE is configured with broadcasted information (SIB), or if the UE is configured with dedicated signaling, or if the UE has to use pre-configured information, which includes UE type/Service type sensing information, the UE uses the indicated sensing information to do sensing and the following transmission, e.g., if the second set parameters are included, the pedestrian UE uses the second set parameters for sensing.

However, if the second set parameters are not included, the pedestrian UE performs one of the operations below:

Alt a> uses the first set of parameters for sensing (see FIG. 4B(1)).

Alt b> no need to do sensing, instead, do autonomous random resource selection directly (see FIG. 4B(2)).

If none of the sensing related parameters are included, then the pedestrian UE does autonomous random resource selection directly. In view of and explained by the foregoing, an aspect of the technology disclosed herein is a pedestrian related vehicle-to-Everything (V2X) user equipment (UE) that comprises receiving circuitry and controlling circuitry and is configured to perform the acts of FIG. 4B(3). Act 4B(3)-1 comprises receiving system information which comprises a parameter set for pedestrian related V2X communications. Act 4B(3)-2 comprises determining, based on the parameter set, whether the pedestrian related V2X UE performs random selection or the pedestrian related V2X UE performs sensing.

During a resource sensing phase, the energy consumption mainly occurs within the sensing window, which includes the behavior of decoding scheduling assignments (SAs) transmitted by other wireless terminals and resource energy measurements. Therefore, changing the sensing window size can help change energy consumption. The window size change does not necessarily mean the window size must be reduced; it could simply reduce window size so as to reduce energy consumption in each sensing window; or increase window size for each sensing so as to increase energy consumption in each sensing window, but due to more sensing information for better resource selection, decrease sensing frequency by scheduling more SPS transmission after each sensing, as above mentioned; therefore has overall better power efficiency.

Figure 10:
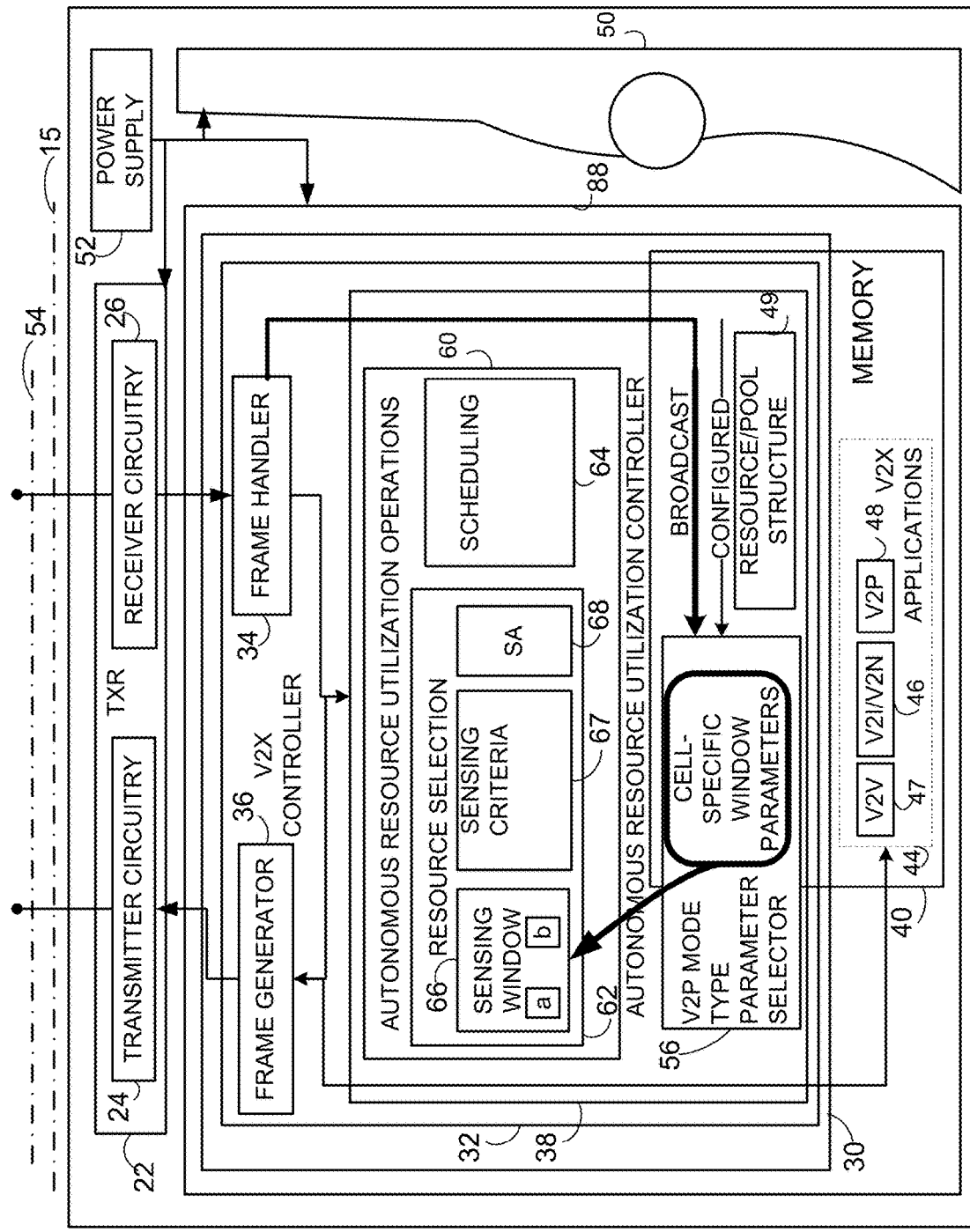
FIG. 10 is a schematic view showing an example V2P/P2V mode type wireless terminal which adjusts a resource sensing time window to be cell-specific.

In the above regard, FIG. 10 shows an example embodiment and mode of a wireless terminal 20(10) which manages a sensing window in a power saving manner for use in V2P/P2V mode type communications. Elements, units, and functionalities of the wireless terminal 20(10) of FIG. 10 which have the same reference numerals as other embodiments and modes described herein are understood to have similar structure and operation as described with reference to correspondingly number or labeled elements of the other embodiments. As in other embodiments and modes, the processor 30 is configured to perform a resource sensing operation (e.g., sensing window procedure 66) of an autonomous resource utilization procedure 60 over a sensing time window. In the example embodiment and mode of FIG. 10, the processor 30 configures the sensing time window to have a sensing time window size which is both (1) particularly suitable for a vehicle-to-pedestrian/pedestrian-to-vehicle (V2P/P2V) mode; and (2) suitable for a cell providing coverage for the wireless terminal. Thus the processor 30 provides a cell-specific sensing window size for the V2P/P2V mode type wireless terminal 20(10). The cell-specific window size may be specified by parameters such as parameters "a" and "b" shown and described with reference to FIG. 7A, for example. Using the cell-specific window size the wireless terminal 20(10) thereafter continues to perform the autonomous resource utilization procedure and thereby obtains a selected radio resource(s) for a V2P/P2V mode communication. Thereafter the transceiver circuitry 22 participates in the V2P/P2V mode communication over a radio interface using the selected radio resource(s).

Thus, the example embodiment and mode of FIG. 10 utilizes a set of new sensing window size-related parameters for pedestrian UEs. These cell-specific sensing window size parameters could be any relevant parameter(s) successfully implementing this above function. The cell-specific sensing window size parameters may include parameters which define or specify an endpoint of the sensing window, such as the parameters "a" and "b" above described with reference to FIG. 7A, but is not limited to these parameters. While the parameters "a" and "b" historically have had values which are common values for all vehicle UEs, as explained herein the parameters "a" and "b" in example embodiments and modes described herein may be assigned values that are specific to the V2P/P2V mode type.

In an example embodiment and mode, the transceiver 22 of wireless terminal 20(10) obtains the parameter(s) affecting the sensing time window size, e.g., the cell-specific sensing window size parameters, from a broadcast of a base station node.

Figure 11:
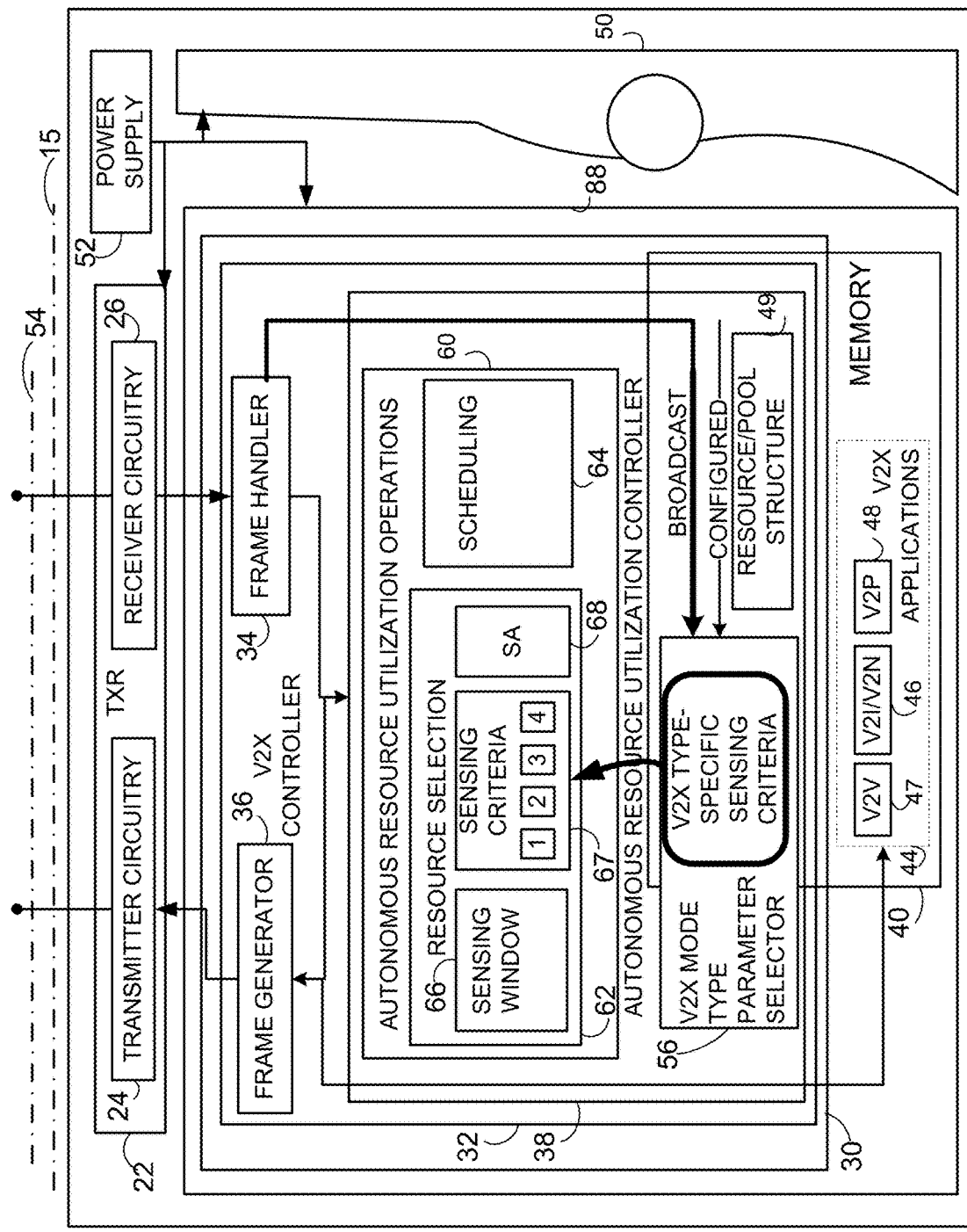
FIG. 11 is a schematic view showing an example wireless terminal which adjusts sensing criteria to be V2X mode type-specific.

FIG. 11 shows an example embodiment and mode of a wireless terminal 20(10) which manages a sensing behavior (also known as sensing criteria) in a power saving manner for use in V2P/P2V mode type communications. Elements, units, and functionalities of the wireless terminal 20(11) of FIG. 11 which have the same reference numerals as other embodiments and modes described herein are understood to have similar structure and operation as described with reference to correspondingly number or labeled elements of the other embodiments. As in other embodiments and modes, the processor 30 is configured to perform a resource sensing operation (e.g., sensing window procedure 66) of an autonomous resource utilization procedure 60 over a sensing time window. However, in performing the sensing window procedure 66, the behavior or criteria of the sensing is governed by special values of parameters that are specific to the particular V2X mode type of the wireless terminal 20(11).

Thus, in the example embodiment and mode of FIG. 11 the processor 30 performs a resource selection operation 62 of an autonomous resource utilization procedure using resource selection criteria selected for wireless terminal in dependence on a particular V2X mode type of communication to be performed by the wireless terminal. FIG. 11 particular shows by an arrow the resource selection criteria selected for wireless terminal in dependence on a particular V2X mode type of communication being applied to sensing criteria selection procedure 67. Thereafter, having used the sensing criteria in the sensing window procedure 66, processor 30 selects the selected radio resource(s) for a communication of the particular V2X mode type. Such parameters related to differing sensing behavior or sensing criteria are illustrated in FIG. 5, FIG. 11, and FIG. 7B as Behavior/Criteria Parameters 1-4 (shown in correspondingly labeled boxes within sensing criteria selection procedure 67). In correspondence with the parameter number the parameters specifies that the one behavior/criteria for the resource sensing is one or more of the following:

Behavior/Criteria Parameter 1: certain default criteria for the particular V2X mode type.
Behavior/Criteria Parameter 2: based on the particular V2X mode type battery information.
Behavior/Criteria Parameter 3: based on base station information or higher layer information.
Behavior/Criteria Parameter 4: based on the wireless terminal's own congestion level measurement.

Figure 12:
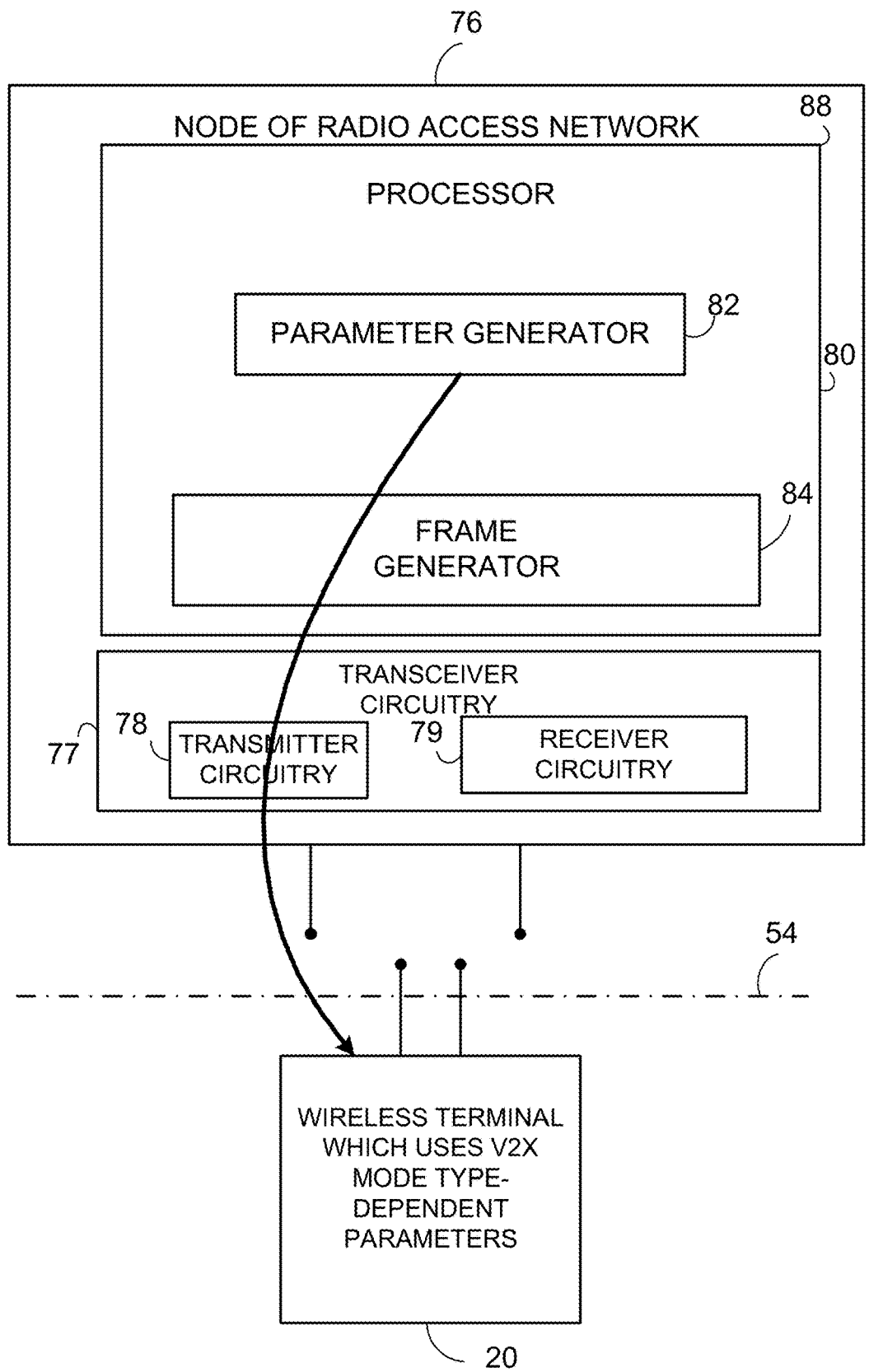
FIG. 12 is a schematic view showing an example base station which may transmit parameters or other information to a particular V2X mode type wireless terminal for use in operation of the particular V2X mode type wireless terminal in accordance with the techniques and methods disclosed herein.

FIG. 12 shows an example, generic node of a radio access network, also simply called base station 76. The base station 76 of FIG. 12 may transmit parameters or other information to a particular V2X mode type wireless terminal 20 for use in operation of the particular V2X mode type wireless terminal in accordance with the techniques and methods disclosed herein. As shown in FIG. 12, the base station 76 comprises base station transceiver circuitry (TRX) 77, which in turn comprises base station transmitter circuitry 78 and base station receiver circuitry 79. The transceiver base station circuitry 77 includes antenna(e) for the base station 76. The base station 76 further comprises base station processor circuitry, also herein known more simply as base station processor 80. The base station processor 80 of base station 76 may also be associated with, electronically coupled to, or comprise memory (e.g., memory circuitry), of types elsewhere described herein. While processor 80 may have responsibility for operation of many aspects of base station 76 not specifically described herein, in one of its aspects processor 80 serves as generator 82 for parameters or other information which is transmitted to the wireless terminals 20 of the example embodiments and modes described herein when such wireless terminals require node or network information. Such parameters or other information, whether transmitted by broadcast or dedicated signaling or otherwise may, in at least in some embodiments, be generated in a frame or subframe, for which reason the base station 76 is also illustrated as comprising frame generator 84.

In recapping, during the SI phase of V2X the topic of power consumption of pedestrian UEs has been investigated. Although battery consumption may not be a problem for vehicle UEs, it is a key issue for pedestrian UEs. In RAN1 #85 the following conclusion was made: It is concluded that V2P services, where P-UE sends V2X messages but does not receive V2X messages, is substantially more power efficient than V2P services where P-UE receives V2X messages from V-UEs. The transmission of a pedestrian UE is thus prioritized in the WI "LTE-based V2X Services" [RP-161298, "LTE based V2X Services", Busan, South Korea, Jun. 13-16, 2016], which was agreed in the most recent 3GPP RAN #72 meeting.

Meanwhile the fundamental baseline of V2X study is trying to reuse the existing V2V design, unless necessary modifications are identified to be beneficial, in terms of power consumption and UE complexity in case of P2V transmissions. In autonomous resource selection for V2V services, the vehicle UE has to perform sensing before transmission, so as to improve PRR performance with less resource selection collision. However, sensing which includes SA decoding and energy measurement also consumes power. Therefore, it may be said that "random resource selection for P-UEs potentially on the PC5 resource pool shared with V-UE transmissions, with additional study on sensing operation during a limited time for P-UEs".

The technology disclosed herein therefore has focused, at least in part, on the study of power saving for pedestrian UEs on their sensing behaviors, especially in urban areas with high density of vehicle UEs and pedestrian UEs. The technology disclosed herein encompasses the following technical considerations and features:

With the baseline that sensing can generate good PRR performance gain in UE autonomous resource selection, study should focus on reducing sensing active energy consumption for pedestrian UEs. On the other hand, the working assumption of partial sensing window method is if there is no sensing activity, then the pedestrian UE treats it as all resources are occupied or reserved by other UEs, thus the pedestrian UE cannot transmit. Comparing with the vehicle UE in complete sensing window method (the sensing method defined for vehicle UEs in V2V service), the pedestrian UE loses some opportunities for transmission. This may come up with service delay issue, especially for non-delay-tolerant P2V service. Allowing sensing in limited time may not be sufficient to handle the problem; especially it may generate some other problems.

Power saving for pedestrian UEs should not only be from allowing sensing in limited time only; the study should be open to other power saving methods. Another important fact for handling pedestrian UE battery issue is the performance gain of pedestrian UEs shouldn't be obtained at the cost of obvious V2V performance degradation. It may be that that is the reason the WI emphasizes the resources be to selected as "shared by vehicle UEs", because if we want to segment the resource pool, from which one or more dedicated resource pools are formed and allocated to pedestrian UEs; it avoids any collision between vehicle UE and pedestrian UE resource selections, and thus obtains performance gain for pedestrian UE. However, as it limits the resource selection scope for vehicle UE, it degrades the performance of vehicle UE in system level.

The design of pedestrian UE power saving methods shouldn't affect V2V service performance.

As one method of power saving for pedestrian UE, during SPS scheduling of UE autonomous resource selection, more pedestrian UE TBs should be allowed to be scheduled after each sensing, which can be indicated by one SA. The extreme case of is after the initial sensing, the SA indicates that some frequency resources are always reused by pedestrian UE, which is similar to allocating dedicated resource pool to pedestrian UE. Nevertheless, the fundamental difference is the SPS scheduling has an extra release procedure, which can release the resources being used if necessarily, and the released resources can be used by other UEs, including vehicle UEs; while pedestrian UE dedicated resource pool cannot be used by vehicle UEs in any situation; further, reference to "more" TBs scheduled after each sensing, the comparison benchmark is current V2V configuration. In the partial sensing window method, it was mentioned that the sensing related parameters should be UE specific, instead of cell specific, like in V2V, e.g., the sensing window size related parameters "a" and "b" are common values for all vehicle UEs. The advantage is it can randomize the sensing activities to avoid congestion. However, in our understanding, especially for UE autononous resource selection, it's better to have more cell specific parameters, which can be beneficial for vehicle UE resource selection, even it can't successfully decode some pedestrian SA information during sensing. Of course, another advantage is more cell specific parameters can save a lot of RRC signaling costs.

Similar as V2V service design, when designing power saving method for pedestrian UE sensing, common parameters instead of UE specific values should be considered more if required.

Non-limiting example embodiment and modes described herein or encompassed hereby include the following:

Example Embodiment 1: A wireless terminal comprising:
processor circuitry configured:
  to select, based on a particular V2X mode type, of a parameter to use in an autonomous resource utilization procedure wherein the wireless terminal selects radio resource(s) for use in a V2X communication of the particular V2X mode type;
  to perform the autonomous resource utilization procedure based on the selection of the parameter;
transceiver circuitry configured to participate in the V2X communication of the particular V2X mode type over a radio interface using the selected radio resource(s).

Example Embodiment 2: The wireless terminal of example embodiment 1, wherein the particular V2X mode type is a vehicle-to-pedestrian/pedestrian-to-vehicle (V2P/P2V) mode.

Example Embodiment 3: The wireless terminal of example embodiment 1, wherein the processor circuitry is configured to make the selection of a first set of parameters and a second set of parameters for use in the autonomous resource utilization procedure, the second set of parameters being configured for use in the autonomous resource utilization procedure for operation in the particular V2X mode type.

Example Embodiment 4: The wireless terminal of example embodiment 3, wherein the second set of parameters is configured for use in the autonomous resource utilization procedure for power-saving operation in the particular V2X mode type and the first set of parameters is configured for use in the autonomous resource utilization procedure for operation in either a V2X mode type other than the particular V2X mode type or for plural V2X mode types.

Example Embodiment 5: The wireless terminal of example embodiment 4, wherein the particular V2X mode type is a vehicle-to-pedestrian/pedestrian-to-vehicle (V2P/P2V) mode.

Example Embodiment 6: The wireless terminal of example embodiment 3, wherein the first set of parameters and the second set of parameters are obtained from system information broadcasted from a base station node of a radio access network (RAN).

Example Embodiment 7: The wireless terminal of example embodiment 6, wherein the first set of parameters and the second set of parameters are obtained from respective information elements of a same system information block broadcasted from the base station node of the radio access network (RAN).

Example Embodiment 8: The wireless terminal of example embodiment 3, wherein the first set of parameters and the second set of parameters are configured at the wireless terminal.

Example Embodiment 9: The wireless terminal of example embodiment 1, wherein the processor circuitry is configured to check availability of a set of parameters particularly configured for the particular V2X mode type, and in accordance with the check:
  if the set of parameters particularly configured for the particular V2X mode type is available, to use the set of parameters particularly configured for the particular V2X mode type for the autonomous resource if utilization procedure;
  if the set of parameters particularly configured for the particular V2X mode type is not available, to use another set of parameters associated with at least one other V2X mode type.

Example Embodiment 10: The wireless terminal of example embodiment 1, wherein the processor circuitry is configured check availability of a set of parameters particularly configured for the particular V2X mode type, and in accordance with the check:

if the set of parameters particularly configured for the particular V2X mode type is available, to use the set of parameters particularly configured for the particular V2X mode type for the autonomous resource if utilization procedure;

if the set of parameters particularly configured for the particular V2X mode type is not available, to randomly select a radio resource(s).

Example Embodiment 11: The wireless terminal of example embodiment 1, wherein the autonomous resource utilization procedure comprises a resource selection operation, and wherein the parameter is related to an endpoint of a resource sensing window of the resource selection operation.

Example Embodiment 12: The wireless terminal of example embodiment 1, wherein the autonomous resource utilization procedure comprises a resource selection operation, and wherein the parameter is related to selection criteria for resource selection.

Example Embodiment 13: The wireless terminal of example embodiment 12, wherein the parameter specifies one of the following:
  both scheduling assignment decoding and resource energy measurement are to be used as the selection criteria in the resource selection operation;
  only scheduling assignment decoding is to be used as the selection criteria in the resource selection operation;
  scheduling assignment decoding for only selected other wireless terminals is to be used as the selection criteria in the resource selection operation;
  only resource energy measurement are to be used as the selection criteria in the resource selection operation.

Example Embodiment 14: The wireless terminal of example embodiment 1, wherein the autonomous resource utilization procedure comprises transmission using a selected radio resource in the particular V2X mode.

Example Embodiment 15: The wireless terminal of example embodiment 14, wherein a size of a transmission window in which semi-persistent scheduling of the particular V2X mode transmission occurs is dependent on the parameter.

Example Embodiment 16: The wireless terminal of example embodiment 14, wherein frequency at which semi-persistent scheduling of the particular V2X mode transmission occurs is dependent on the parameter.

Example Embodiment 17: The wireless terminal of example embodiment 1, wherein the processor circuitry is configured:
  to select, based on a particular V2X mode type, of plural parameters to use in the autonomous resource utilization procedure;
  to perform the autonomous resource utilization procedure based on the selection of the plural parameters.

Example Embodiment 18: A method of operating a wireless terminal comprising:
  selecting, based on a particular V2X mode type, of a parameter to use in an autonomous resource utilization procedure wherein the wireless terminal selects radio resource(s) for use in a V2X communication of the particular V2X mode type;
  performing the autonomous resource utilization procedure based on the selection of the parameter; and
  participating in the V2X communication of the particular V2X mode type over a radio interface using the selected radio resource(s).

Example Embodiment 19: A wireless terminal comprising:
  electronic memory circuitry configured to store a description of a common resource pool(s) of radio resources ordinarily available for use in communications of plural V2X modes types;
  processor circuitry electronically coupled to the electronic memory circuitry and configured, in conjunction with selection of a selected resource(s) from the common resource pool(s) for a communication of a particular V2X mode type:
    to generate a scheduling assignment signal which informs of allocation of the selected resource(s) for the communication of a particular V2X mode type;
    to reserve the selected resource(s) for use by the wireless terminal in scheduling semi-persistent transmissions of data for the communication of the particular V2X mode type, the semi-persistent transmissions comprising periodical use of the selected resource(s) over a transmission time window, all of the semi-persistent transmissions of the data for the communication of the particular V2X mode type being based on the same scheduling assignment signal;
  transceiver circuitry configured to participate in the V2X communication of the particular V2X mode type over a radio interface using the selected radio resource(s).

Example Embodiment 20: The wireless terminal of example embodiment 19, wherein the particular V2X mode type is a vehicle-to-pedestrian/pedestrian-to-vehicle (V2P/P2V) mode.

Example Embodiment 21: The wireless terminal of example embodiment 19, wherein the processor circuitry is further configured
  to reserve the selected resource(s) for use by the wireless terminal in the scheduling of the semi-persistent transmissions of the data for the communication of the particular V2X mode type to the exclusion of any other communications; but
  to release the selected resource(s) back to the common pool for use by other communications after a finite time duration or upon occurrence of a trigger event.

Example Embodiment 22: The wireless terminal of example embodiment 19, wherein the processor circuitry is further configured to determine a size of a transmission time window, in which the semi-persistent transmissions of the data for the communication of the particular V2X mode type occurs, in dependence on the particular V2X mode type.

Example Embodiment 23: The wireless terminal of example embodiment 19, wherein the processor circuitry is further configured to determine a frequency at which the semi-persistent transmissions of the data for the communication of the particular V2X mode type occurs in dependence on the particular V2X mode type.

Example Embodiment 24: A wireless terminal comprising:
  electronic memory circuitry configured to store a description of a common resource pool(s) of radio resources ordinarily available for use in communications of plural V2X modes types;
  processor circuitry electronically coupled to the electronic memory circuitry and configured, in conjunction with selection of a selected resource(s) from the common resource pool(s) for a communication of a particular V2X mode type:
    to allocate the selected resource(s) for use by the wireless terminal in scheduling semi-persistent transmissions of data for the communication of the particular V2X mode type, the semi-persistent transmissions comprising periodical use of the selected resource(s) over a transmission time window;
to determine a size of a transmission time window, in which the semi-persistent transmissions of the data for the communication of the particular V2X mode type occurs, in dependence on the particular V2X mode type;
transceiver circuitry configured to participate in the V2X communication of the particular V2X mode type over a radio interface using the selected radio resource(s).

Example Embodiment 25: The wireless terminal of example embodiment 24, wherein the processor circuitry is further configured to include an indication of the size of a transmission time window in a scheduling assignment (SA) signal.

Example Embodiment 26: A wireless terminal comprising:
electronic memory circuitry configured to store a description of a common resource pool(s) of radio resources ordinarily available for use in communications of plural V2X modes types;
processor circuitry electronically coupled to the electronic memory circuitry and configured, in conjunction with selection of a selected resource(s) from the common resource pool(s) for a communication of a particular V2X mode type:
to allocate the selected resource(s) for use by the wireless terminal in scheduling semi-persistent transmissions of data for the communication of the particular V2X mode type, the semi-persistent transmissions comprising periodical use of the selected resource(s) over a transmission time window;
to determine a frequency at which the semi-persistent transmissions of the data for the communication of the particular V2X mode type occurs in dependence on the particular V2X mode type;
transceiver circuitry configured to participate in the V2X communication of the particular V2X mode type over a radio interface using the selected radio resource(s).

Example Embodiment 27: The wireless terminal of example embodiment 26, wherein the processor circuitry is further configured to include an indication of the frequency at which the semi-persistent transmissions of the data for the communication of the particular V2X mode type occurs in a scheduling assignment (SA) signal.

Example Embodiment 28: A method of operating a wireless terminal comprising:
in conjunction with selection of a selected resource(s) from a common resource pool(s) for a communication of a particular V2X mode type:
generating a scheduling assignment signal which informs of allocation of the selected resource(s) for the communication of a particular V2X mode type;
reserving the selected resource(s) for use by the wireless terminal in scheduling semi-persistent transmissions of data for the communication of the particular V2X mode type, the semi-persistent transmissions comprising periodical use of the selected resource(s) over a transmission time window, all of the semi-persistent transmissions of the data for the communication of the particular V2X mode type being based on the same scheduling assignment signal;
participating in the V2X communication of the particular V2X mode type over a radio interface using the selected radio resource(s).

Example Embodiment 29: A wireless terminal comprising:
processor circuitry configured:
to perform a resource sensing operation of an autonomous resource utilization procedure over a sensing time window, the sensing time window having a sensing time window size configured:
to be particularly suitable for a vehicle-to-pedestrian/pedestrian-to-vehicle (V2P/P2V) mode; and
to be specific to a cell providing coverage for the wireless terminal;
to perform the autonomous resource utilization procedure and thereby obtain a selected radio resource(s) for a V2P/P2V mode communication;
transceiver circuitry configured to participate in the V2P/P2V mode communication over a radio interface using the selected radio resource(s).

Example Embodiment 30: The wireless terminal of example embodiment 29, wherein the transceiver is further configured to obtain a parameter affecting the sensing time window size from a broadcast of a base station node.

Example Embodiment 31: The wireless terminal of example embodiment 30, wherein the parameter affecting the sensing time window size is an endpoint of the sensing time window.

Example Embodiment 32: A method of operating a wireless terminal comprising:
performing a resource sensing operation of an autonomous resource utilization procedure over a sensing time window, the sensing time window having a sensing time window size configured:
to be particularly suitable for a vehicle-to-pedestrian/pedestrian-to-vehicle (V2P/P2V) mode; and
to be specific to a cell providing coverage for the wireless terminal;
performing the autonomous resource utilization procedure and thereby obtaining a selected radio resource(s) for a V2P/P2V mode communication;
participating in the V2P/P2V mode communication over a radio interface using the selected radio resource(s).

Example Embodiment 33: A wireless terminal comprising:
processor circuitry configured to perform a resource selection operation of an autonomous resource utilization procedure using resource selection criteria selected for wireless terminal in dependence on a particular V2X mode type of communication to be performed by the wireless terminal, and thereby obtain a selected resource(s) for a communication of the particular V2X mode type;
transceiver circuitry configured to participate in the communication of the particular V2X mode type over a radio interface using the selected radio resource(s).

Example Embodiment 34: The wireless terminal of example embodiment 33, wherein resource selection criteria is at least one of the following:
certain default criteria for the particular V2X mode type;
based on the particular V2X mode type battery information;
based on base station information or higher layer information;
based on the wireless terminal's own congestion level measurement.

Example Embodiment 35: A method of operating a wireless terminal comprising:
performing a resource selection operation of an autonomous resource utilization procedure using resource selection criteria selected for wireless terminal in dependence on a particular V2X mode type of communication to be performed by the wireless terminal, and thereby obtain a selected resource(s) for a communication of the particular V2X mode type;

participating in the communication of the particular V2X mode type over a radio interface using the selected radio resource(s).

Example Embodiment 36: An access node of a radio access network (RAN), comprising:

processor circuitry configured to generate a signal to inform a wireless terminal of a parameter to be used by the wireless terminal in an autonomous resource utilization procedure, the parameter being a parameter uniquely associated with a particular V2X mode type as opposed to (1) V2X mode types other than the particular V2X mode type or (2) plural V2X node types;

transmitter circuitry configured to transmit the parameter to the wireless terminal over a radio interface.

Example Embodiment 37: The access node of example embodiment 36, wherein the parameter is related to size of a sensing window utilized by the wireless terminal in a resource sensing procedure.

Example Embodiment 38: The access node of example embodiment 36, wherein the parameter is related to size of a resource allocation window to be used by the wireless terminal in the autonomous resource utilization procedure.

Example Embodiment 39: A pedestrian related vehicle-to-Everything (V2X) user equipment (UE) comprising:

receiving circuitry configured to receive system information which contains a parameter set for pedestrian related V2X communications; and controlling circuitry configured to determine, based on the parameter set, whether the pedestrian related V2X UE performs random selection or the pedestrian related V2X UE performs sensing.

Example Embodiment 39: A method for a pedestrian related vehicle-to-Everything (V2X) user equipment (UE), the method comprising:

receiving system information which contains a parameter set for pedestrian related V2X communications; and determining, based on the parameter set, whether the pedestrian related V2X UE performs random selection or the pedestrian related V2X UE performs sensing.

Figure 13:
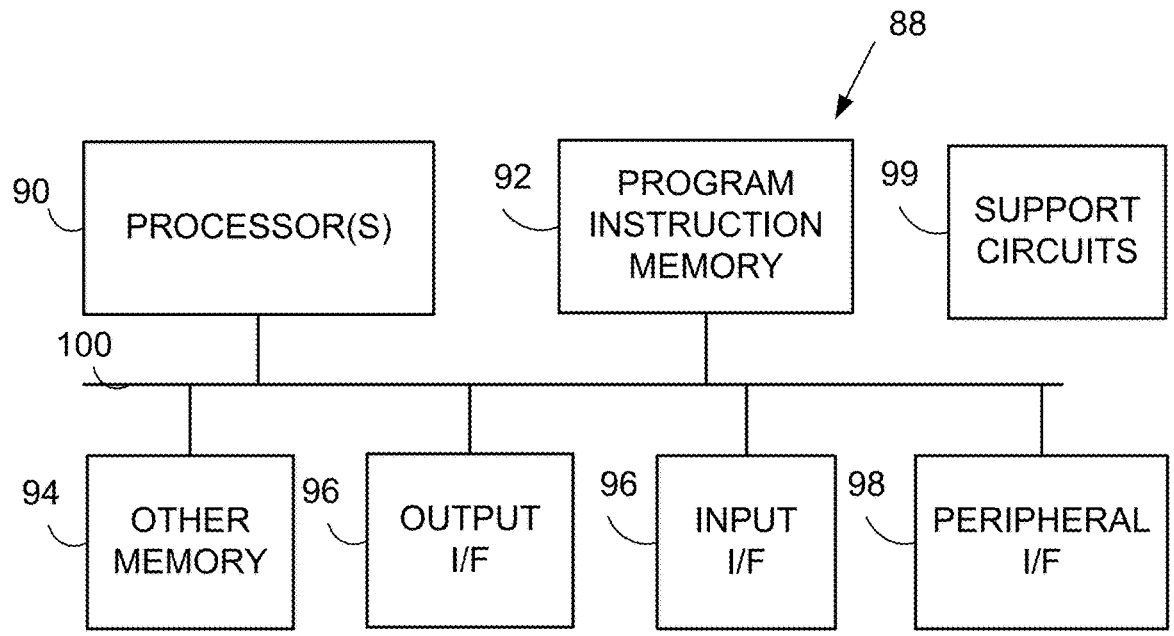
FIG. 13 is a diagrammatic view showing example electronic machinery which may comprise node electronic machinery or terminal electronic machinery.

Certain units and functionalities of wireless terminal 20 and base station 76 may be implemented by terminal electronic machinery 88. FIG. 13 shows an example of such electronic machinery 88 as comprising one or more processors 90, program instruction memory 92; other memory 94 (e.g., RAM, cache, etc.); input interface 96; output interfaces 97; peripheral interfaces 98; support circuits 99; and busses 100 for communication between the aforementioned units. The processor(s) 90 may comprise the processor circuitries described herein, for example, such as processor 30 or base station processor 80.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 40 shown in the various example embodiments and modes described herein or encompassed hereby. The support circuits 99 are coupled to the processors 90 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 20 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a wireless terminal and a base station, so that, for example, operation of these entities may occur more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment (UE) that performs sidelink communication associated with pedestrian-UE related Vehicle-to-Everything (V2X) communication, the UE comprising:
receiving circuitry configured to receive a system information block including a parameter related to random selection and/or a parameter related to sensing;
controlling circuitry configured:
to determine, based on whether or not the parameter related to sensing is included in the system information block, which of the sensing or the random selection is used for UE autonomous resource selection; and
to use the sensing for UE autonomous resource selection in a case that the parameter related to sensing and the parameter related to random selection are included in the system information block; and
transmitting circuitry configured to perform, based on the sensing or the random selection determined, a transmission of sidelink control information and data using a resource pool, in a case that the use of the sensing or the random selection is determined for the UE autonomous resource selection.

2. A method for user equipment (UE) that performs sidelink communication associated with pedestrian-UE related Vehicle-to-Everything (V2X) communication, the method comprising:
receiving a system information block including a parameter related to random selection and/or a parameter related to sensing;
determining, based on whether or not a parameter related to sensing is included in the system information block, which of sensing or random selection is used for UE autonomous resource selection;
determining to use the sensing for UE autonomous resource selection in a case that the parameter related to sensing and the parameter related to random selection are included in the system information block; and
performing, based on the sensing or the random selection determined, a transmission of sidelink control information and data using a resource pool, in a case that the use of the sensing or the random selection is determined for the UE autonomous resource selection.

* * * * *